US007343243B2

(12) United States Patent
Smith et al.

(10) Patent No.: US 7,343,243 B2
(45) Date of Patent: *Mar. 11, 2008

(54) FULLY AUTOMATED VEHICLE DISPATCHING, MONITORING AND BILLING

(75) Inventors: Chris C. Smith, deceased, late of Cincinnati, OH (US); Elizabeth G. Smith, legal representative, Cincinnati, OH (US); Kenneth W. Edwards, Independence, KY (US)

(73) Assignee: Total Technology, Inc., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/466,654

(22) Filed: Aug. 23, 2006

(65) Prior Publication Data
US 2006/0293835 A1 Dec. 28, 2006

Related U.S. Application Data

(62) Division of application No. 10/747,476, filed on Dec. 29, 2003, now Pat. No. 7,113,864, which is a division of application No. 10/195,042, filed on Jul. 15, 2002, now Pat. No. 6,694,248, which is a division of application No. 08/980,645, filed on Dec. 1, 1997, now Pat. No. 6,430,496, which is a division of application No. 08/549,380, filed on Oct. 27, 1995, now Pat. No. 5,835,376.

(51) Int. Cl.
*G06F 19/00* (2006.01)
(52) U.S. Cl. .................... 701/117; 342/357.07
(58) Field of Classification Search .............. None
See application file for complete search history.

(56) References Cited

U.S. PATENT DOCUMENTS 3,467,025 A   9/1969   Bradt ...................... 104/172

(Continued)

FOREIGN PATENT DOCUMENTS

EP   0123562   10/1984

(Continued)

OTHER PUBLICATIONS

Software AG, *Shaving seconds of response time can mean the difference between an ambulance and a body bag.*, Wall Street Journal, Jul. 25, 1995.

(Continued)

*Primary Examiner*—Michael J. Zanelli
(74) *Attorney, Agent, or Firm*—Wood, Herron & Evans, LLP

(57) ABSTRACT

A system for controlling vehicles (20) to provide transportation services without need for human intervention. A database (10) stores records each documenting needed transportation services. Processing circuitry (which may be one or several networked computers) performs a dispatching process (26) which reviews these records, locates records indicating a need for immediate transportation service, and instructs vehicles to provide the service. The processing circuitry also performs a monitoring process (28) which monitors vehicle activities by reviewing the records, and automatically obtained vehicle activity information, to identify transportation services which are not being adequately provided, and refer these to human dispatchers (16) for special attention. A variety of methods for obtaining and updating vehicle activity information are disclosed, as are various applications for the system.

20 Claims, 17 Drawing Sheets

US 7,343,243 B2

Page 2

U.S. PATENT DOCUMENTS

| | | | | |
|---|---|---|---|---|
| 3,611,301 | A | 10/1971 | Parks | 340/172.5 |
| 3,867,577 | A | 2/1975 | Herrington | 179/2 R |
| 3,885,757 | A | 5/1975 | Alexandrov et al. | 243/19 |
| 4,015,804 | A | 4/1977 | Dobler et al. | 246/5 |
| 4,092,718 | A | 5/1978 | Wendt | 364/436 |
| 4,212,069 | A | 7/1980 | Baumann | 364/467 |
| 4,360,875 | A | 11/1982 | Behnke | 364/436 |
| 4,613,913 | A | 9/1986 | Phillips | 360/51 |
| 4,646,015 | A | 2/1987 | Phillips | 324/253 |
| 4,686,642 | A | 8/1987 | Buxton et al. | 364/607 |
| 4,701,760 | A | 10/1987 | Raoux | 340/993 |
| 4,713,661 | A | 12/1987 | Boone et al. | 340/994 |
| 4,734,863 | A | 3/1988 | Honey et al. | 364/449 |
| 4,791,571 | A | 12/1988 | Takahashi et al. | 364/436 |
| 4,799,162 | A | 1/1989 | Shinkawa et al. | 364/436 |
| 4,831,539 | A | 5/1989 | Hagenbuch | |
| 4,839,835 | A | 6/1989 | Hagenbuch | 702/174 |
| 4,922,514 | A | 5/1990 | Bergeron et al. | 379/6 |
| 4,928,099 | A | 5/1990 | Drake | 340/825.28 |
| 5,068,654 | A | 11/1991 | Husher | 340/903 |
| 5,068,656 | A | 11/1991 | Sutherland | 340/989 |
| 5,122,959 | A | 6/1992 | Nathanson et al. | 701/117 |
| 5,168,451 | A | 12/1992 | Bolger | 364/401 |
| 5,187,810 | A | 2/1993 | Yoneyama et al. | 455/34.1 |
| 5,218,344 | A | 6/1993 | Ricketts | 340/573 |
| 5,243,529 | A | 9/1993 | Kashiwazaki | 364/449 |
| 5,297,049 | A | 3/1994 | Gurmu et al. | 364/436 |
| 5,325,290 | A | 6/1994 | Cauffman et al. | 364/401 |
| 5,327,347 | A | 7/1994 | Hagenbuch | 364/424.07 |
| 5,396,540 | A | 3/1995 | Gooch et al. | 379/59 |
| 5,428,546 | A | 6/1995 | Shah et al. | 364/449 |
| 5,461,390 | A | 10/1995 | Hoshen | 342/419 |
| 5,467,268 | A | 11/1995 | Sisley et al. | 364/401 |
| 5,485,161 | A | 1/1996 | Vaughn | |
| 5,493,694 | A | 2/1996 | Vlcek et al. | 455/53.1 |
| 5,497,149 | A | 3/1996 | Fast | 340/988 |
| 5,539,645 | A | 7/1996 | Mandhyan et al. | 701/119 |
| 5,550,551 | A | 8/1996 | Alesio | 342/457 |
| 5,604,676 | A | 2/1997 | Penzias | |
| 5,708,417 | A | 1/1998 | Tallman et al. | 340/539 |
| 5,731,785 | A | 3/1998 | Lemelson et al. | 342/357 |
| 5,758,313 | A | 5/1998 | Shah et al. | |
| 5,835,376 | A | 11/1998 | Smith et al. | 701/117 |
| 5,928,294 | A | 7/1999 | Zelinkovsky | |
| 6,430,496 | B1 | 8/2002 | Smith et al. | 701/117 |
| 6,694,248 | B2 | 2/2004 | Smith et al. | 701/117 |
| 7,113,864 | B2 | 9/2006 | Smith et al. | 701/117 |

FOREIGN PATENT DOCUMENTS

| | | |
|---|---|---|
| GB | 2 261 977 | 11/1991 |
| WO | WO 95/21405 | 8/1995 |

OTHER PUBLICATIONS

Harvard Business School, *Burlington Northern: The ARES Decision (A)*, Publishing Division, Harvard Business School, 1991.
Carey, Wm. M., *Trainspotting: To Avoid Collisions, Some Railroads Test Satellite Positioning*, Wall Street Journal, Jun. 29, 1998, pp. A1 & A6.
Malory Davies, *On the Right Track*, Distribution, Dec. 1994.
Racecab Enterprises, L.C., Racecab.com Web Site, http://www.racecab.com/technology, 1999.
Logistics Management Web Site Article, *Fleet Software Picking a Winning Hand*, http://www.manufacturing.net/magazine/logistic/archives/1997/log0801 tsoft.htm, Aug. 1, 1997.
MDSI Web Site, *Advantex- Telecommunications*, http://www.mdsi-advantex.com/)3pr/O307.html, Nov. 27, 1998.
Intergraph Utilities Web Site, *Computer aided dispatch for utilities. Streamlining field operations is more important than ever.*, http://www.intergraph.com/utilities/dispatch.asp, copyright 2000.
3M INFO System Web Site, *Integrated Fleet Operations (INFO) System Information Page*, http://www.3m.com/its/infosys.html, printed Mar. 13, 2000.
John Christie's SENTRAC Web Site, *SENTRAC Functionality Document*, http://people.ce.mediaone.net/jchristie/sendoc8.html, Dec. 1, 1997.
Automatic Dispatch Web Site, *Master Dispatcher (Automatic and Semi Automatic Dispatching)*, http://ascar.com/Software/master_dispatcher.html, Feb. 9, 2000.
LADS Network Solutions Web Site, *LADS.net NEWS Global Positioning System ( GPS)*, http://ladsnet.com/news/winter98/gps.htm, 1998.
Mobilair Web Site, *Emergency Road Service—Integration*, http://www.mobilair.qc.ca/eng/roadse.htm, printed Mar. 13, 2000.
ATS Web Site, *Air Ground Transportation: Case Study Los Angeles International Airport (LAX) System Overview*, http://www.itss.com/ats.htm, printed Mar. 13, 2000.
SIGTEC Web Site, *SIGTEC Systems*, http://www.sigtec.com.au/page1.html, 1997.
Williams, Rudi, *DoD Eliminating Paper Mileage Search*, American Forces Press Service, DefenseLINK Web Site, http://www.defenselink.mil/news/Jun1998/n06291998_9806293.html, Jul. 17, 1998.
Web.net Web Site, *6. Intelligent Transportation Systems*, The Role of Transportation Technologies in Reducing Greenhouse Gas Emissions; http://www.web.net/users/ortee/transportation/report3/chap6.html, printed Mar. 13, 2000.
Lightstone Group's Web Site Press Release, *The Lightstone Group Provides Food Distribution Companies with a Powerful Software Tool for Expedient Routing and Scheduling*, http://www.lightstone.com/press/pr1997-10-14.html, Oct. 14, 1997.
ASCAR Web Site Press Release, *Automatic Problems or Profits*, http://www.ascar.com/In_the_News/press_release_1.html, Courier Magazine, Apr.-Jun. 1997.
Northern Light Web Site, *PC User—My cab management System*, http://library.northernlight.com/LW19970923040199382.HTML?CB=0&SC=0, 1995.
Malick, Daniel F., *Certified Wide Area Road Use Monitoring*, http://home.earthlink.net/~dmalick?CWAR UM/cwarum1.html, printed Mar. 13, 2000.
Fujitsu-ten Web Site, *Mobile Communications Systems. Advanced mobile communications technology helping of networks to grow in our information oriented society.*, http://www.fujitsu-ten.com.jp/outline/mobile-e.html, printed Mar. 13, 2000.
Pagenet Web Site, *PageNet Introduces DeliveryMate™ Automatic Dispatch Service*, http://www.pagenet.com/press/pr2399.htm, May 10, 1999.
Andover Controls Message Board, *Re: Looking For Remote Monitoring Service Company*, http://webserv.andover%5Fuser%5Fforum/%Fdisc/10000017a.htm, 1997.
Srinivasan, Kalpana, *FCC to Act on Spectrum Request*, Associated Press AP Online, Oct. 21, 1999.
Hyde, Justin, *GM Touts On-Board Internet Service*, Associated Press AP Online, Nov. 3, 1999.
Instep Mobile Web Site, *The Zone Concept*, http://www.instepmobile.com/Products/eDispatch2...raphic/Zone.htm, Nov. 9, 1998.
InStep Mobile Web Site, *InStep Sells First "Shrinked Wrapped" Computerized Taxi Dispatch System to Day City Cab. It's the first wireless dispatch system to use the new CDPD Cellular Data Network.*, http://www.instepmobile.com/pressinfo/96/oct24.htm, Oct. 24, 1996.
Witsend Software Web Site, *Fleet InSight GPS/AVL Fleet Management System*, http://www.witsend.com/products/gps/information/roi.htm, 1998.
Map Trax Web Site, *RASTRAC®*, http://www.maptrax.com.au/rastrac.htm, 1999.
Zurück, *AIFS Automatisches Dispatching*, date unknown.
Blackmon, Douglas A., *FedEx CEO Smith Bets His Deal Will Recast the Future of Shipping*, The Wall Street Journal Interactive Edition, WSJ.com, Nov. 4, 1999.

| | Dispatch File |
|---|---|
| 1 | Transport ID Number |
| 2 | Status Flag (=" ", "D", "C", or "F") |
| 3 | Date of Service |
| 4 | Appointment Time (=<time> or "ASAP") |
| 5 | Lead Time |
| 6 | Transport Type (Wheelchair/Basic/AdvancedLifeSupport) |
| 7 | Vehicle ID Number |
| 8 | Driver Employee Number |
| 9 | Attendant Employee Number |
| 10 | Pickup Location |
| 11 | Pickup Latitude |
| 12 | Pickup Longitude |
| 13 | Destination Location |
| 14 | Destination Latitude |
| 15 | Destination Longitude |
| 16 | Time of Call |
| 17 | Time Crew Notified |
| 18 | Time Crew Dispatched |
| 19 | Time Crew En Route to Pickup (Scene) |
| 20 | Time Crew Arrived at Pickup (Scene) |
| 21 | Time Crew En Route to Destination |
| 22 | Time Crew Arrived at Destination |
| 23 | Time Crew Reported as Available |
| 24 | Reason for transport 1 |
| 25 | Reason for transport 2 |
| 26 | Reason for transport 3 |
| 27 | Reason for transport 4 |
| 28 | Patient ID number |
| 29 | Name of caller |
| 30 | Contract number |
| 31 | Base rate codes |
| 32 | Mileage rate codes |
| 33 | Extra services rate codes |
| 34 | Billing address codes |

FIG. 3A

|   | Invoice File |
|---|---|
| 1 | Transport ID Number |
| 2 | Date of Service |
| 3 | Vehicle ID Number |
| 4 | Driver Employee Number |
| 5 | Attendant Employee Number |
| 6 | Pickup Location |
| 7 | Destination Location |
| 8 | Time of Call |
| 9 | Time Crew Notified |
| 10 | Time Crew Dispatched |
| 11 | Time Crew En Route to Pickup (Scene) |
| 12 | Time Crew Arrived at Pickup (Scene) |
| 13 | Time Crew En Route to Destination |
| 14 | Time Crew Arrived at Destination |
| 15 | Time Crew Reported as Available |
| 16 | Reason for transport 1 |
| 17 | Reason for transport 2 |
| 18 | Reason for transport 3 |
| 19 | Reason for transport 4 |
| 20 | Patient ID number |
| 21 | Name of caller |
| 22 | Contract number |
| 23 | Base rate codes |
| 24 | Mileage rate codes |
| 25 | Extra services rate codes |
| 26 | Billing address codes |

FIG. 3B

|   | Outbound Vehicle File |
|---|---|
| 1 | Vehicle ID Number |
| 2 | Transport ID Number |

FIG. 3C

|   | Employee File |
|---|---|
| 1 | Employee ID Number |
| 2 | Employee Name |

FIG. 3D

|   | Employee Pager File |
|---|---|
| 1 | Employee ID Number |
| 2 | Pager Service Code Number |
| 3 | Pager PIN Number |
| 4 | Pager Phone Number |
| 5 | Text or Alpha ("T" or "A") |

FIG. 3E

|   | Pager Service File |
|---|---|
| 1 | Pager Service Code Number |
| 2 | Pager Service Modem Number |
| 3 | Pager Modem Login ID |
| 4 | Pager Modem Password |
| 5 | Pager Modem Baud Rate |
| 6 | Pager Modem Word Length |
| 7 | Pager Modem Stop Bits |
| 8 | Pager Modem Script Name |

FIG. 3F

Automated Dispatch Requests File
Message Packet Key Code
    Terminal ID Number
    Transport ID Number
    Unique Sequence Number (000)
Message Body

FIG. 3G

Automated Dispatch Responses File
Message Packet Key Code
    Terminal ID Number
    Transport ID Number
    Unique Sequence Number (000)
Message Body

FIG. 3H

|   | Automated Dispatch Setup File |
|---|---|
| 1 | Company Code |
| 2 | Dispatch Advance Action Setting (minutes) |
| 3 | Monitor Status Late Activity ("Yes"/"No") |
| 4 | AVL Port Operating System Name |
| 5 | AVL Port Lock File Name |

FIG. 3I

|   | Exception File |
|---|---|
| 1 | Transport ID Number |
| 2 | Exception code |

FIG. 3J

|   | Status Limit File |
|---|---|
| 1 | Company Code |
| 2 | Notified limit (minutes) |
| 3 | Dispatched limit (minutes) |
| 4 | En Route to Pickup limit (minutes) |
| 5 | Arrived limit (minutes) |
| 6 | En Route to Destination limit (minutes) |
| 7 | At Destination Limit (minutes) |
| 8 | ASAP Limit (minutes) |

FIG. 3K

```
From CAD record code = 01
record ID = transport number + terminal number + sequence (000)
transport / vehicle type (als / bls / w/c)
pick up address
pick up city
pick up state
pick up zip code
quantity of vehicle to return from search
CRC
```

FIG. 3K-1

```
From AVL record code = 02
record ID = transport number + terminal number + sequence (000)
vehicle string (sorted closest to farthest away from address)
CRC
```

FIG. 3K-2

```
From CAD record code = 10
record ID = transport number + terminal number + sequence (000)
vehicle ID number
pick up address
pick up city
pick up state
pick up zip
destination address
destination city
destination state
destination zip
CRC
```

FIG. 3L-1

```
From AVL record code = 11
record ID = transport number + terminal number + sequence (000)
route string
CRC
```

FIG. 3L-2

```
From CAD record code = 30
record ID = transport number + terminal number + sequence (000)
vehicle ID number
transport number
date of service
appointment time
transport type
patient name
patient phone number
pick up street address
pick up city
pick up state
pick up zip code
destination street address
destination city
destination state
destination zip code
reason for transport 1
reason for transport 2
reason for transport 3
reason for transport 4
time of call
notified
dispatched
in route
arrive pick up
in route
arrive destination
available
route message
CRC
```

FIG. 3M-1

```
From AVL record code = 31
record ID = transport number + terminal number + sequence (000)
CRC
```

FIG. 3M-2

```
From CAD record code = 70
record ID = transport number + terminal number + sequence (000)
transport number
vehicle number
pickup street address
pickup city
pickup state
pickup zip code
destination street address
destination city
destination state
destination zip code
CRC
```

FIG. 3N-1

```
From AVL record code = 71
record ID = transport number + terminal number + sequence (000)
transport number
pickup latitude
pickup longitude
destination latitude
destination longitude
CRC
```

FIG. 3N-2

```
From CAD record code = 60
record ID = vehicle ID number
vehicle ID number
transport number
transport type
appointment time
transport status code
transport status time
driver employee number
attendant employee number
patient name
pick up address
pickup city
pickup state
pick up zip code
destination address
destination city
destination state
destination zip code
CRC
```

FIG. 3O-1

```
From AVL record code = 61
record ID = vehicle number
CRC
```

FIG. 3O-2

```
From AVL
record code = 20
record ID = transport number + vehicle number
status level (1 - 8 from mobile data terminal switch device)
CRC
```

FIG. 3R-1

```
From CAD record code  21
record ID = transport number + vehicle number
status level (1 - 8 returned for acknowledgment)
CRC
```

FIG. 3R-2

```
From AVL record code = 50
record ID = vehicle ID number
CRC
```

FIG. 3P-1

```
From CAD record code = 51
vehicle ID number
transport number
transport type
appointment time
transport status code
transport status time
driver employee number
attendant employee number
patient name
pick up address
pick up city
pick up state
pick up zip code
destination address
destination city
destination state
destination zip code
CRC
```

FIG. 3P-2

From CAD record code = 40
record ID = transport number + vehicle ID number + sequence (000)
vehicle ID number
transport number
date of service
appointment time
transport type
patient name
patient phone number
pick up street address
pick up city
pick up state
pick up zip code
destination street address
destination city
destination state
destination zip code
reason for transport 1
reason for transport 2
reason for transport 3
reason for transport 4
time of call
notified
dispatched
in route
arrive pick up
in route
arrive destination
available
CRC

FIG. 3Q-1

From CAD record code = 41
record ID = transport number + vehicle ID number + sequence (000)
vehicle ID number
CRC

FIG. 3Q-2

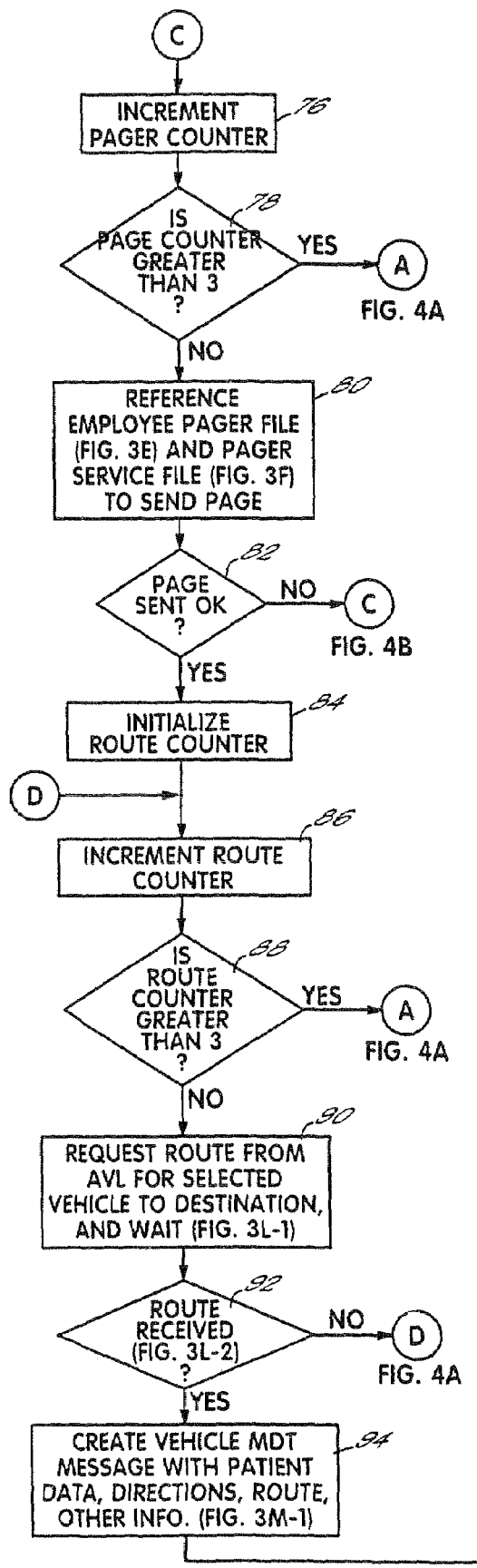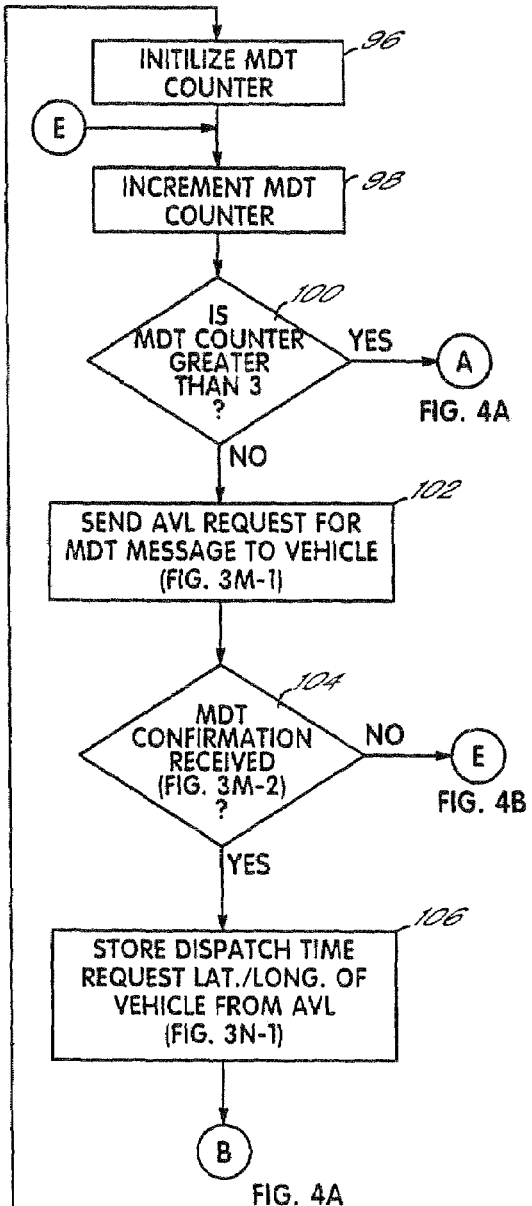
FIG. 4B

FULLY AUTOMATED VEHICLE DISPATCHING, MONITORING AND BILLING

CROSS REFERENCE TO RELATED APPLICATIONS

This application is a divisional of prior application Ser. No. 10/747,476, filed Dec. 29, 2003, issued as U.S. Pat. No. 7,113,864, on Sep. 26, 2006, which is a divisional of prior application Ser. No. 10/195,042, filed Jul. 15, 2002, issued as U.S. Pat. No. 6,694,248, on Feb. 17, 2004, which is a divisional of prior application Ser. No. 08/980,645, filed on Dec. 1, 1997, issued as U.S. Pat. No. 6,430,496, on Aug. 6, 2002, which is a divisional of prior application Ser. No. 08/549,380, filed on Oct. 27, 1995, issued as U.S. Pat. No. 5,835,376, on Nov. 10, 1998. These prior applications are hereby incorporated herein by reference in their entirety.

FIELD OF THE INVENTION

The present invention relates to dispatching or controlling of taxis, ambulances, or other vehicles.

BACKGROUND OF THE INVENTION

A number of systems have been devised for dispatching of vehicles or other services upon demand. The complexity of dispatching systems ranges from fully manual systems to systems employing elaborate computer databases and tracking systems.

To dispatch vehicles accurately and in a timely fashion, several things must be done concurrently. Vehicles must be tracked so that their location is known so that they may be efficiently selected for future jobs. The position and status of dispatched vehicles must be monitored to determine if they are on time or delayed. Customer requests must be received and posted for dispatching, and then dispatched. Delayed arrivals should be identified and reported to the customer as soon as possible.

A fully manual dispatching system (such as is employed by smaller taxi companies), requires a single human being to perform all of the tasks identified above. More modern dispatching systems provide automation of some of the described tasks.

For example, various systems have been established to manage the reception and posting of customer requests. For example, the "Life-TRAK" system, available from the assignee of the present application, provides a database server storing a database of customer request records. New records are generated by call takers who receive incoming telephone calls from customers. Also, records may be generated at remote sites, for example by contract customers, and transmitted into the central database by telephone connections. The customer requests are then reported to dispatchers who determine when the requests are in need of service, and dispatch a vehicle as needed.

There are also commercially available systems for assisting the dispatching tasks described above. For example, there are commercially available Automatic Vehicle Locator (AVL) systems which automatically track (typically via satellite navigation) the locations of managed vehicles, so that this information can be reported to a dispatcher in textual or graphic form to assist the dispatcher determining the locations of vehicles. Typically, the dispatcher uses this information to select a vehicle for a particular job, and then forwards instructions to the driver to assign them the job.

Often, the AVL includes data fields where the dispatcher may store an indication of the status of a vehicle (e.g., dispatched or available) and the vehicle's capabilities (e.g., wheelchair-compatible, etc.) so that this information can be used by the dispatcher in selecting a vehicle for a job and monitoring activity of the vehicles.

Advanced AVL systems further facilitate dispatching, by automatically identifying, upon request, the nearest vehicles to a given address or latitude/longitude position, to assist the dispatcher in selecting a vehicle for dispatch. Furthermore, AVL systems may also include a street map database and search algorithm through which the AVL can identify a street route from one address to another upon request from the dispatcher.

In some cases, the dispatcher communicates with the vehicles via radio communication or cellular telephone connections. In other cases, the AVL system itself includes support for textual communication between dispatchers and the vehicles through mobile data terminals (MDT's) mounted in the vehicle, which typically make use of underlying cellular communication networks.

SUMMARY OF THE INVENTION

Despite the high degree of automation that has been applied to vehicle dispatching, as described above, one common thread between fully manual dispatching and the most automated dispatching systems is their central reliance on human beings to make dispatching decisions and perform monitoring of vehicles once dispatched. Unfortunately, it has been found that a primary source of errors, in even the most automated dispatching systems, is human error. For example, a dispatcher may misread customer job request and fail to dispatch it on time. Or the dispatcher may forward a dispatch to a vehicle through a MDT but fail to follow up and ensure that the MDT message has been acknowledged by the vehicle driver and that the vehicle is en route, causing the vehicle to arrive late, or not at all. Or, in the case of taxi or ambulance/ambulette dispatching, the dispatcher may through inadvertence assign a taxi which is not wheelchair-equipped to a job which requires a wheelchair-equipped vehicle, or assign an ambulette (wheelchair ambulance) to a job which requires a stretcher ambulance, resulting in wasted time and/or delay for the customer. Or special instructions relating to the customer, route, or other items may fail to be forwarded to the vehicle.

It is the object of the present invention to overcome these shortcomings in known vehicle dispatching systems by providing a fully automated dispatching system which, at least under normal operating conditions, eliminates the human dispatcher from dispatching operations. The elimination of human errors of the kind described in the previous paragraph greatly improves the consistency of service provided to customers and improves the likelihood of repeat requests.

In one specific aspect, the invention features a system for controlling vehicles to provide transportation services without need for human intervention, including a database of records each documenting needed transportation services. This database is reviewed by processing circuitry to locate records indicating a need for immediate transportation service, and then instruct vehicles to provide the vehicle service. In addition, the processing circuitry monitors the records after dispatching, along with vehicle activity information, to identify transportation services which are not being adequately provided. The processing circuitry is in continuous automatic communication with the vehicles, forwarding instructions to vehicles and obtaining vehicle activity information relating to each vehicle.

The processing circuitry may be a microcomputer running a multitasking operating system, a network of computers, or any other arrangement of computing hardware, including an arrangement of computers spread geographically in a wide-area network. There may be multiple processes to dispatch and monitor vehicles, running simultaneously on networked computers or in a multitasking operating system.

The vehicle communications may use ground-based radio communication, satellite-based radio communication, or both. In particular, satellite-based vehicle tracking circuitry may be used to track the locations of the vehicles, and the vehicle locations forwarded via satellite or radio to the processing circuitry for use in vehicle monitoring.

The vehicle monitoring may evaluate the vehicle's movements and position to determine if it has arrived at or is en route to an appointed location. Alternatively, or in addition, the vehicle operator may manually communicate the arrival of the vehicle at the appointed location.

Requests for vehicle service may be entered by call takers at the location of the database server, or may be entered remotely via telephone, either at a data terminal at a customer site or via touch-tone telephone or at an ATM-like facility using a customer identification card.

When the automated dispatching and controlling system finds a task which is not being adequately serviced, and cannot rectify the situation, the system creates an exception record to refer this situation to a human dispatcher who then may take extraordinary action with respect to the situation.

The automated dispatching and controlling system not only collects vehicle appointment and activity information, but also collects billing information associated with requested transportation services, for example, in an ambulance environment, the patient name, diagnosis, reason for transit, insurance information, etc. When a task is completed, this information is used to automatically, and without further human involvement, generate paper or electronic invoicing for the services rendered.

The system may also be used to monitor use of the vehicles, e.g., whether the vehicle is moving, the velocity of the vehicle, whether the vehicle is braking, fuel usage of the vehicle, whether emergency signals of the vehicle are operating, and whether the engine is idling. This information can be used to determine, in a more detailed manner, the status of the vehicle, e.g., whether it is stalled in traffic, or whether the vehicle is being used inappropriately. In either case, an exception record can be generated to refer the situation to a human dispatcher.

The collection of information on current vehicle status and future appointments can be combined to provide continual, automated system status management, to determine and predict future needs for transportation services and compare the future needs to expected availability of transportation services. If this process identifies future times at which available transportation services will not meet predicted needs, this situation can be referred to a human dispatcher ahead of time so that corrective action can be taken. Alternatively, or in addition, the system may automatically instruct a vehicle to pre-position to a location where the vehicle will be better able to meet predicted future needs for transportation services, to minimize future delays.

An important feature of the automated dispatching system is that a dispatching process instruction to a vehicle identifies a route to be followed by the vehicle. This feature will be increasingly important in the future when governmental or insurance entities may begin to demand particular routing, or at least identify maximum mileages that will be reimbursed. By ensuring vehicles follow pre-defined routing, these requirements can be more easily met.

Indeed, it is expected that the ability to automatically generate routes, and to automatically provide them to vehicles, in accordance with the present invention, will heighten awareness of mileage charges and result in a demand for systems to review mileage charges (no matter how generated) and compare the mileage charges to the mileage for an optimal routing. Such a system might be used by an insurance or governmental agency to locate excessive mileage charges, or used by a transit company to pre-screen invoices before they are rejected by an insurance or governmental agency. Accordingly, the present invention encompasses systems which make use of existing AVL technology to compute routing and mileage based on invoiced pickup and destination sites, and then compare the mileage of the computed route to the mileage charged in the invoice.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIGS. 3A, 3B, 3C, 3D, 3E, 3F, 3G, 3H, 3I, 3J and 3K are illustrations of the formats of the data files illustrated in FIG. 2;

FIGS. 3K-1, 3K-2, 3L-1, 3L-2, 3M-1, 3M-2, 3N-1, 3N-2, 3O-1, 3O-2, 3P-1, 3P-2, 3Q-1, 3Q-2, 3R-1 and 3R-2 are illustrations of the automated dispatch messages and responses exchanged between the AVL system and automated Communications, Dispatching and Vehicle Monitoring processes illustrated in FIG. 1;

FIGS. 4A and 4B are flow charts of the operations performed by a Dispatching process of FIG. 1;

DETAILED DESCRIPTION OF SPECIFIC EMBODIMENTS

Figure 1:
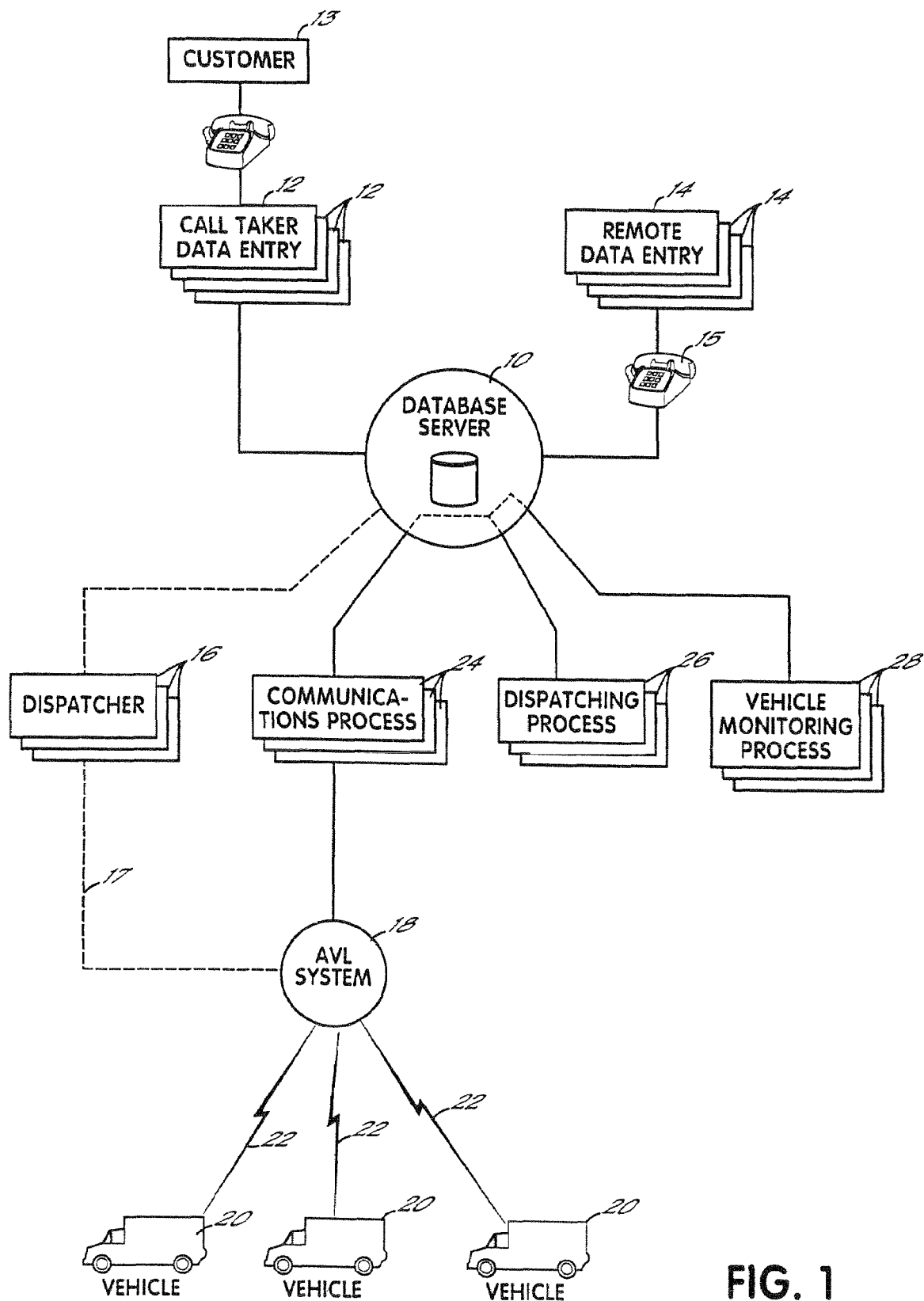
FIG. 1 is a functional block diagram of a fully automated vehicle dispatching, monitoring and billing system in accordance with principles of the present invention.

Referring to FIG. 1, a fully automated vehicle dispatching, monitoring and billing system in accordance with the principles of the present invention, includes several elements for automated dispatching and monitoring which have been discussed above in the background of this application. Specifically, the system includes a database server 10 for storing records indicating requested vehicle services and associated information. This database is created initially at one of two data entry sites 12, 14. Call takers 12 located at the dispatching facility (multiple call takers being illustrated in FIG. 1) receive telephone requests from customers such as customer 13 and, in response, generate request records in the database in several tests. Contract customers 14 may also possess remote data entry terminals at which the customers may enter data into database server 10 over a telephone connection 15.

Incoming requests may also be accepted by various other methods; for example, remote facilities may enter information over a radio, or satellite, or Internet, or other communications links rather than telephones. Furthermore, requests may be entered through touch tone dialing at a touch tone telephone in a manner analogous to that currently used for telephone banking. Another alternative is that requests may be entered at remote kiosks similar to automated teller machines, using health insurance or identification cards issued to customers.

The dispatching facility also includes a number of human dispatchers 16 who interact with data in the database 10 to dispatch vehicles. Dispatchers 16 may interact with the database and server 10 and an AVL system 18 to perform dispatching of vehicles 20 in the same manner as is performed in known dispatching systems as discussed above. Particularly, dispatchers 16 may review request records in database server 10, and in response to these records interact with AVL system 18 to request vehicle location information and routing information and to relay dispatching commands and request status updates from vehicles over wireless communication links 22.

In known dispatching systems described in the background of this application, this kind of interaction between database server 10 and AVL system 18, using human dispatchers 16, is the primary and only mode of operation. However, in accordance with the principles of the present invention, this human-based mode of dispatching is used only in extraordinary circumstances. Under normal circumstances, the interactions with database server 10 and AVL system 18 are fully automated and are performed by communications processes 24, dispatching processes 26 and vehicle monitoring processes 28, which automatically dispatch and monitor vehicles in response to orders reflected in records and database 10.

In accordance with this new and unique model for dispatching of vehicles, dispatchers 16 do not constantly interact with database server 10, AVL system 18, and the vehicle drivers, but rather only interact with the drivers and other systems when extraordinary circumstances require human intervention into the automatic dispatching provided by processes 24, 26 and 28. This infrequent interaction with the AVL system 18 and server 10 is represented by dotted lines 17 and 19 between dispatchers 16, AVL system 18 and database server 10.

Under normal circumstances, as will be explored more fully below, dispatchers 16 have an only supervisory and monitoring role. Dispatchers may, for example, monitor vehicle activities and dispatching to ensure the system is operating properly and perhaps to override automatic dispatching decisions which are obviously erroneous or should be handled differently for policy reasons. Furthermore, dispatchers might update vehicle status information based using intelligence gained from outside the automated dispatch system. However, although dispatchers 16 may perform various monitoring of this kind and may occasionally override automated dispatching, dispatchers 16 will typically only become actively involved in a given dispatching transaction when the automated dispatching processes 24, 26 and 28 identify an exception requiring human intervention and a corresponding exception record is placed into database server 10.

Exception records are immediately reviewed by dispatchers 16, who may then interact with the AVL system 18 to determine the location of the vehicle, and/or may communicate with the driver through the AVL system (in the manner described below) or through a radio, cellular phone, pager, or satellite communications to determine the cause of the exception and resolve the exception.

The following figures and description provide a detailed elaboration of the specific operations of the communications processes 24, dispatching processes 26 and vehicle monitoring processes 28 to automate the previously manual, human-based operations of the dispatchers 16 to permit the dispatchers to focus on exceptional situations.

As an initial matter, it will be understood that the software for performing the remaining tasks illustrated in FIG. 1, such as the local and remote call taking and data entry, dispatcher record monitoring, automated vehicle location and vehicle communication, can be one of a number of commercially available software packages for vehicle dispatching, including, for example, the above-noted "Life-TRAK" software which is particularly suited for dispatching of ambulances. The file formats and software flowcharts described in detail below are particularly suited for incorporation into the existing commercially-available "Life-TRAK" system which is available from the assignee of this patent application.

The software used in "Life-TRAK", and the additional software components described below, are preferably written in a source code language providing easy transport between computing platforms. One particularly suitable source code language is BBx Business Basic, sold by Basis International of Albuquerque, N.Mex. This language provides portability of source code between any one of (a) a PC/DOS/Windows/Windows95 standalone or Novell Netware server environment using BBx for DOS/Novell; (b) a Unix network using serial terminals using BBx for Unix (SCO/AIX/Etc.); (c) a Windows for Workgroups environment with or without a Windows NT server using BBx for Windows for Workgroups. Furthermore, using the BBx TCP Data Server software, any or all of the above can be connected in a wide-area or Internet network.

Suitable Automatic Vehicle Locator systems can be purchased from various vendors including DCS, Inc., Teletrak, American TriTech, and EAI; these AVL systems either include low-level communications protocols of the kind illustrated below in FIGS. 3K-1 to 3R-2 or will revise their AVL systems to support such communications.

It should be noted that a system other than the AVL may be used to support the communications between the dispatching systems and the AVL; for example, there are presently being introduced satellite paging-response systems which permit two way communications between mobile pagers and a central office via direct satellite communications. These systems could be used to transmit and receive the information discussed below in FIGS. 3K-1 to 3R-2.

It is contemplated that a given automated dispatching system may include multiple communications processes 24, dispatching processes 26 and vehicle monitoring processes 28, running independently in networked computing systems. Thus, FIG. 1 illustrates a multiplicity of each process active in the automated dispatching system. The source language used for programming this system must include facilities for locking individual database records for a multiprocessing environment—such record locking is provided by the BBx Business Basic language described above. In the following discussion, the flow charts and operations of each of the communications, dispatching and vehicle monitoring processes will be elaborated with an understanding that multiple processes may be in simultaneous operation at any given time and processing dispatching records in server 10 simultaneously. It will also be understood that human dispatchers 16, because they are freed from most dispatching tasks, will monitor the overall operation of the automated dispatching system and determine whether a "bottleneck" has occurred at any of the communications, dispatching or vehicle monitoring phases of operations, and if so may initiate additional ones of processes 24, 26 or 28, respectively, to provide added computing time to the task which is experiencing a bottleneck.

It is further contemplated that various aspects of the automated dispatching system may be separated physically from one another; so, for example, database server 10 may be at a geographically central location whereas AVL systems and computing systems running processes 24, 26 and 28 may be remotely located and communicating with database server 10 over a wide-area or Internet network through the above-described communications facilities. Other possible combinations of physical locations of the various components illustrated in FIG. 1 are contemplated and within the scope of the present invention.

It will be further appreciated that manual dispatching (such as that which is facilitated by the above-noted "Life-TRAK" system) may be performed in one area using server 10 while automated dispatching is performed in another area. Or, manual and automated dispatching may be performed simultaneously at the same area, or finally automated dispatching may be halted and all dispatching performed manually by dispatchers 16.

Figure 2:
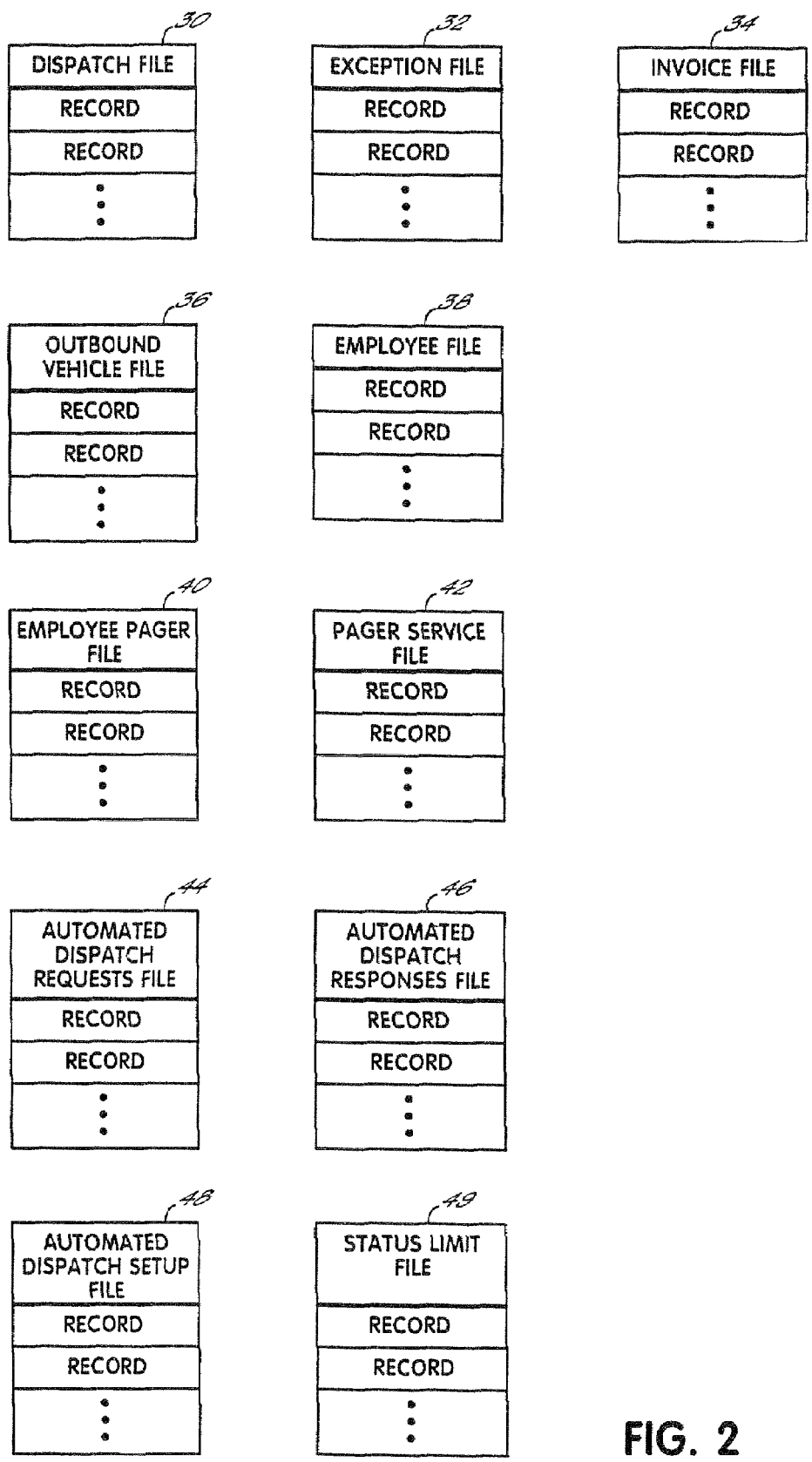
FIG. 2 is an illustration of the various data files stored by the server in FIG. 1 and manipulated by the automated dispatching, monitoring and billing system.

Now turning to FIG. 2, the various data files used by automated dispatch processes 24, 26 and 28 to perform automated dispatching of vehicles 20 can be elaborated. The dispatch file 30 is the primary file used by the automated dispatch processes to store information regarding a job and the status of a vehicle assigned to a job and to interact with other processes in the dispatching system.

The exceptions file 32 contains pointers to the records in the dispatch file which cannot be handled by the automated dispatching processes 24, 26 and 28, and must be managed by human dispatchers 16, as well as an indication of the reasons for why the dispatch record requires human intervention. Software controlled by human dispatchers 16 reviews the exceptions file 32 to locate dispatch records requiring human intervention, so that the dispatcher 16 may evaluate the reasons for the exception and eliminate the problems encountered during automated dispatching. Once this is done, the human dispatcher may re-initiate automated dispatching and monitoring for that record.

Invoice file 34 contains information for generating an invoice for the activities performed by vehicles 20 upon customer request. Invoice files 34 contain detailed information used to generate detailed invoices of the kind needed, for example, for federal and state Medicare and Medicaid agencies. As will be noted in detail below, the automated dispatching system has as a primary feature the automated collection of invoicing information so that this information is readily available for generation of invoices without further human involvement.

Vehicle file 36 and employee file 38 are used to search and identify particular vehicle jobs and particular vehicle operators, as discussed below.

Employee pager file 40 and pager service file 42 are used to page vehicle operators to alert the operators of new dispatching commands being transmitted to the vehicle.

Automated dispatching requests file 44 and automated dispatching responses file 46 are used by communications process 24 to record and maintain communications between database server 10 and AVL system 18 in order to facilitate dispatching and vehicle monitoring operations being performed by dispatching process 26 and vehicle monitoring process 28.

Automated dispatch setup file 48 and status limit file 49 are used by dispatching process 26 and vehicle monitoring process 28 to determine the desired behavior of these processes during dispatching and monitoring of vehicles, as elaborated below.

FIGS. 3A through 3R-2 illustrate specific file and data communications formats used in one embodiment of the present invention to generate and update the files illustrated generally in FIG. 2. Specifically, FIG. 3A illustrates the format of records in dispatch file 30. FIG. 3B illustrates the format of records in invoice file 34. FIG. 3C illustrates the format of records in outbound vehicle file 36. FIG. 3D illustrates the format of records in employee file 38. FIG. 3E illustrates the format of records in employee pager file 40. FIG. 3F illustrates the format of records in pager service file 42.

FIG. 3G illustrates the format of records in automated dispatch requests file 44. Each of these records includes a message packet key code, and a unique record identifier. The message packet key code indicates the particular type of message that follows, e.g., a closest vehicle request (FIG. 3K-1) has a record key code of 01, and a route request (FIG. 3L-1) has a record key code of 10, etc. The record identifier is used to distinguish each record from other records of the same type which may be found from time to time in the requests file 44. The record identifier is generated from a combination of the ID number of the terminal (or process identifier of the process) generating the request, and transport ID number (which uniquely identifies the dispatch record for which the request is made) and a unique sequence number generated by the process 26 or 28 which generated the request. The key code and record identifier are followed by a message packet which can take one of a variety of formats. The specific formats, and their purposes, are illustrated in FIGS. 3K-1, 3L-1, 3M-1, 3N-1, 3O-1, 3P-1, 3Q-1 and 3R-1, and will be elaborated below.

FIG. 3H illustrates the format of records in automated dispatch responses file 46, which are similar in general form to the requests in file 44. Each automated dispatch response record includes a message packet key code and record identifier, followed by the message packet which may take one of a variety of formats. The formats of the message packets that may be included in an automated dispatch response record are shown in FIGS. 3K-2, 3L-2, 3M-2, 3N-2, 3O-2, 3P-2, 3Q-2 and 3R-2, and will be discussed below.

FIG. 3I illustrates the format of records in automated dispatch setup file 48. FIG. 3J illustrates the format of records in the exceptions file 32 and FIG. 3K illustrates the format of records in the status limit file 49.

The use of the files illustrated in 3A-3R-2 will be illustrated in further detail below in connection with FIGS. 4A-6B. Initially, it should be noted that dispatch file records are generated by data entry call takers 12 or remote data entry terminals 14, as part of requesting a vehicle service. When the data entry person at a terminal 12 or 14 creates the dispatch record, the terminal or server through which the person 12 or 14 is interacting generates a dispatch record of the format shown in FIG. 3A, and stores this record into database server 10.

When a dispatch record is created, the data entry person indicates the customer for whom the services have been requested. This information is used to create the transport ID number, which is the first field of the dispatch record. The transport ID number is created by retrieving a code for the customer and appending to this code a sequential number. Accordingly, all of the dispatch records for a given company will have the same initial digits in their transport ID numbers. This is significant because the dispatch file 30 is sorted in accordance with transport ID numbers by database server 10, such that those records for a given company will appear sequentially within dispatch file 30 and exception file 32.

When a dispatch record is initially created by a data entry person 12 or 14, the status flag field of the dispatch record is set to a " " character indicating that the dispatch job is prescheduled, i.e., has not yet been dispatched but has been requested.

The data entry person 12 or 14 also enters the required date of service and appointment time at which vehicle service is desired. This information is stored respectively in the third and fourth field of the dispatch file record. The appointment time may be entered in military time format, or, if service is requested immediately (such as is the case with "911" ambulance service), the appointment time may be entered as "ASAP", indicating that pickup is desired as soon as possible.

Where a particular appointment time has been identified, the data entry person 12 or 14 may indicate a lead time for the appointment, which is a request that the vehicle be allotted additional time to arrive at the pickup location as compared to the ordinary dispatch. A lead time might be entered where the pickup location is an unusual distance away from the normal service area, and so additional time will be required to reach the pickup location. The data entry person 12 or 14 may enter the lead time, or alternatively, database server 10 or the software at data entry terminals operated by call takers 12 or remote data entry persons 14 may generate an estimate for the lead time, based on the pickup address, and store this in the dispatch file record. In either case, the lead time is stored in the fifth field of the dispatch file record.

The pickup and destination addresses and their latitudes and longitudes are indicated in the tenth through fifteenth fields of the data record.

Pickup and destination sites may be coded by the system so that, for example, frequent pickup sites such as hospitals are identified by entering a brief code, which automatically generates the corresponding address, latitude and longitude, and, if a pickup, an appropriate lead time (if any). This functionality would require an additional file (not shown) of pre-stored addresses, latitudes and longitudes, and lead times, indexed by codes that may be entered by a data entry person 12 or 14.

The data entry person 12 or 14 also identifies particular information for the transport service. Specifically, the type of transport is indicated in the sixth field. The transport type may indicate any special requirements for the transport, depending upon the particular application. In the case of ambulance dispatch services, the transport type may indicate wheelchair or advanced life support, respectively indicating that an ambulette (a wheelchair-configured ambulance) can be used, or that an ambulance equipped for advanced life support is required.

For ambulance service in particular, it is useful to fill out other fields at the time the dispatch record is created by a data entry person, such as the reasons for the transport (fields 24-27), a patient ID number for indexing patient-specific information from a patient information file (not shown), the name of the caller or customer who requested the transport (field 29), the contract number if a contract customer is requesting the services (field 30), and codes for accessing additional files for billing information, such as the base rate, mileage rate, extra services rate, and billing address. This detailed billing information is particularly useful in an ambulance dispatching environment due to the level of detailed invoicing needed to satisfy health insurance and Medicare/Medicaid requirements to obtain reimbursement. By incorporating this information into a dispatching record at initiation, this information can be readily moved into an invoicing record after the task is completed and used for accurate and rapid billing for services without further human involvement.

The dispatch record also includes a number of fields (fields 16-23) for tracking the vehicle activity. These fields are filled out as the vehicle performs the desired task. This information is also extremely important for customer invoicing due to insurance and Government requirements, and therefore is also transferred to invoice records upon completion of the task. To start the process of collecting data for later use, at the time the dispatch record is initially created, the time of the call is recorded in field 16 of the dispatch record.

It should be noted that the dispatch file format can be used readily to schedule vehicle services hours or days, or even weeks or months in advance and also to request vehicle services on an immediate basis. For example, to request services at a future date, the data entry person 12 or 14 need only put in the desired date of service into the third field of the record. To request services at a given time on today's date, the data entry person need only put in today's date of service in the third field and the desired appointment time in the fourth field. Finally, the data entry person 12 or customer 14 may request immediate ambulance service on an as soon as possible basis, by entering "ASAP" as the appointment time.

Once a data entry person 12 or 14 creates a dispatch record as described above, the automated dispatch processes 24, 26 and 28 will automatically cause a vehicle to be dispatched in accordance with the parameters set forth in the dispatch record, and will ensure that the vehicle arrives at pickup location approximately at the appointment time and arrives at the destination. As these events occur, the automated dispatch processes 24, 26 and 28 fill out fields 16-23 of the dispatch record to indicate the time that the crew of the vehicle was notified, the time that they were dispatched with the specific instructions, the time that they responded and indicated that they were en route, the time that they arrived at the pickup site or scene, the time that they were en route to the destination, the time that they arrived at the destination, the time that they completed their task and reported themselves as available. In addition, the automated dispatch processes 24, 26 and 28 will fill in the vehicle identification number and the driver and attendant employee numbers in the fields 7-9 of the dispatch record. As a result, all of this information is available to generate detailed invoices for delivery to the customer of sufficient detail to satisfy federal and state Medicare and Medicaid authorities.

It will be noted that the dispatch records, which accumulate over time, include sufficient information to collectively determine the movements of each vehicle throughout each business day. Accordingly, these records can be collectively analyzed to determine the extent to which vehicles are being properly utilized and to potentially develop and revise marketing and vehicle positioning strategies for optimizing performance. Furthermore, these records may be used to generate detailed reports of nearly every format indicating the utilization of a particular vehicle, the on-time performance of a particular driver or crew, and any other kind of reporting information that management may seek in order to understand and improve operation of the dispatching operation. The analyses available through dispatching records are substantially more detailed and comprehensive than those that are supplied by AVL systems, since the AVL system can only rely on stored records of vehicle movements and cannot couple these to records of customer requests and response times, customer characteristics, and all of the other information available in dispatch files.

It should also be noted that, in accordance with the invention, a single database server contains both the information on current vehicle positions and status, and information on future appointments for vehicle use. Because this information is collected in a single server, for the first time it is possible to perform status management procedures, to predict future needs for vehicles and prepare for those needs, by combining the present vehicle position and status information with known and predicted future appointments. A process performing a regular analysis of this kind can be extremely useful in predicting future bottlenecks in service and notifying human managers ahead of time, so that, for example, the human managers may bring in additional vehicles and crews, on overtime if needed, to avoid delays. Furthermore, the status management process might identify a need for an additional vehicle in a particular position and pre-dispatch the vehicle to a hold position where the vehicle will be more readily available to service future tasks.

Another file worthy of initial comment is the outbound vehicle file 36, the format of which is illustrated in FIG. 3C. This file is automatically updated with records by the automated dispatch processes 24, 26 and 28 whenever a vehicle is assigned to a given task. The records in this file indicate simply the vehicle's ID number and the transport ID number for the transport task to which the vehicle has been assigned. This file can then be used to identify, for a given vehicle, all of the transport tasks that have been completed by or are assigned to the vehicle. This can be useful in evaluating whether a given vehicle is available, or alternatively in evaluating the amount of work that has been done by a given vehicle and the paths followed by the vehicle during a given day.

Another file of note is the employee file 38, the format of which is seen in FIG. 3D. This file contains records, each of which indicates the ID number and the employee's name. This file is useful for displaying employee names when a dispatcher 16 must handle an exception condition which has been identified by the automated dispatch. Furthermore, this file may be used when generating invoices to indicate employee's names rather than their ID numbers.

The automated dispatch setup file 48, records of which are illustrated in FIG. 3I, indicates setup parameters for the automatic dispatch processes 24, 26 and 28 on a company-by-company basis. The use of this file permits the automated dispatch system to provide different performance or different behaviors for different companies who request vehicle services from the automated dispatching system. Each record includes the company code of the company for the settings in the record. And the second field includes a dispatch advanced action setting, which is a time in minutes that the automatic dispatch system uses to determine when a vehicle should be dispatched for an appointment, as discussed below in connection with FIG. 5. The third field of the setup file records is a flag to indicate whether the automated dispatch system should monitor vehicle status updates to determine if a vehicle status update is late in being received, as discussed below in connection with FIG. 5. Finally, the fourth and fifth fields of the setup records indicate the specific AVL operating system and AVL port locking file, for the automatic vehicle locating system being used for the particular customer. This permits different automatic vehicle locating systems to be used for different customers, and potentially allows different fleets of vehicles to be dispatched with a single automated dispatching site through the use of different AVL systems and/or different AVL access ports.

The exception file illustrated in FIG. 3J includes, as noted below, the transport ID numbers for dispatch records which have been marked for human intervention, along with codes indicating the reasons that the records were marked for human intervention.

The status limit file shown in FIG. 3K includes fields used to customize the performance of the automated dispatching system for a given customer. Most importantly, this file indicates the time limits for which a vehicle may remain at a given status during performance of an automatically dispatched task. The use of these fields will be discussed below. Also, this file may contain fields (not shown) indicating particular codes or keywords used by dispatcher as a shorthand for a vehicle status conditions (e.g., "vehicle is 20" meaning the vehicle is en route to the pickup), so that different codes or keywords may be used in screen displays and in communications for different fleets of vehicles.

Figure 4A:
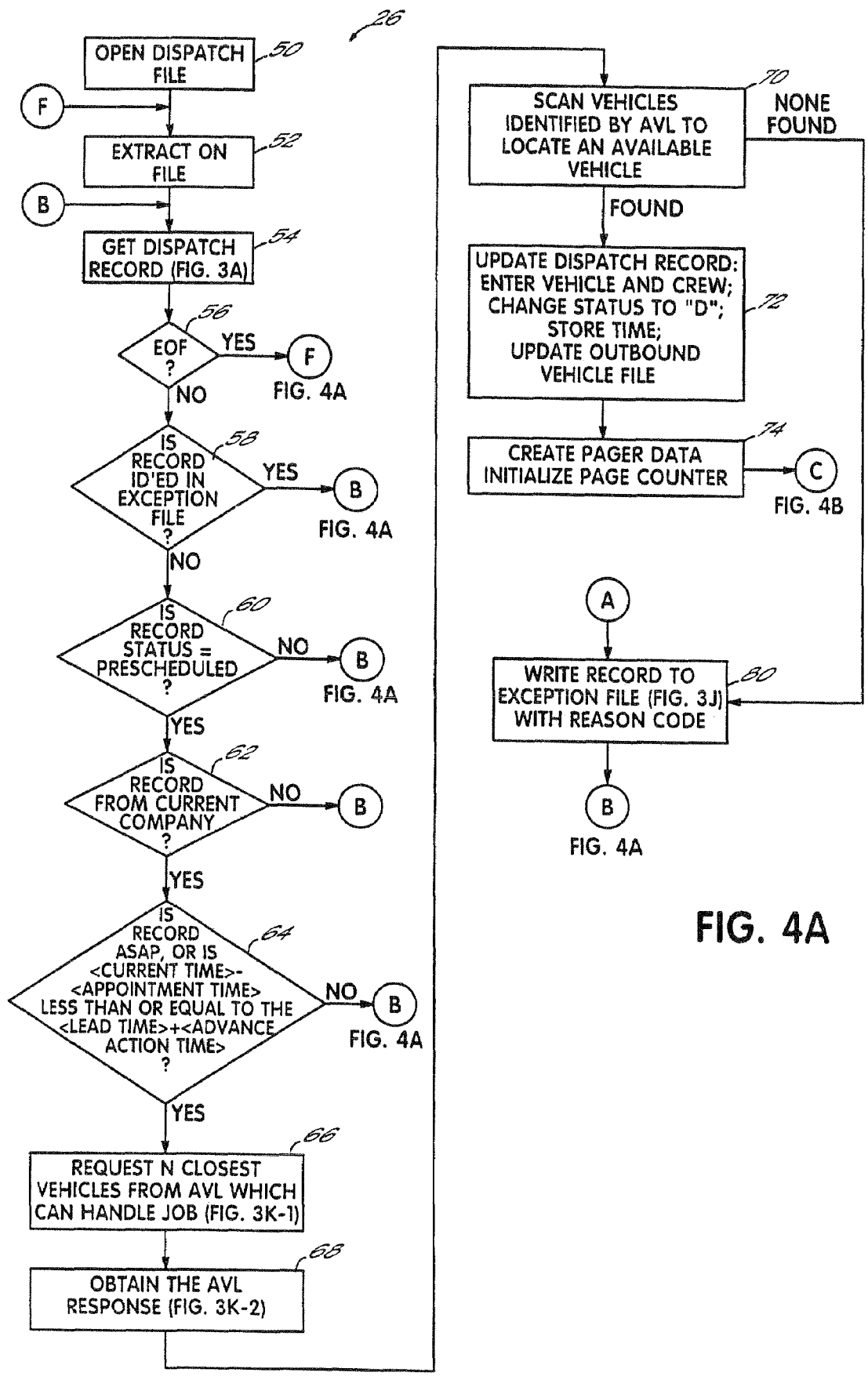

Now turning to the detailed functions of the automatic dispatching processes 24, 26 and 28, FIG. 4A is an illustration of the dispatching processes 26. At the beginning of this process, the dispatch file 30 is opened 50 to permit evaluation of dispatch requests added to the dispatch file by call takers 12 or 14. Next, the dispatching process 26 extracts 52 individual records such as that shown in FIG. 3A from the dispatch file.

The records from the dispatch file are processed sequentially in a loop beginning with step 54, at which a dispatch record is obtained from the results of the extracting step 52. This loop includes a sequence of steps illustrated in the remainder of FIG. 4A.

First, dispatching process 26 determines 56 if it has reached the end of the dispatch file. If the dispatcher has reached the end of the dispatch file, it returns to step 52 to re-extract records from the dispatch file and begin again at the beginning of the file. If the dispatching process 26 has not reached the end of the dispatch file, it proceeds to step 58 to determine whether the currently selected record is identified by the exception file 32 (this involves looking through the records {FIG. 3J} in the exception file 32 to locate any records having the same transport ID number as the current dispatch record). If the currently selected record is identified by the exception file 32, this indicates that there has been an unrecoverable error during automatic dispatching and monitoring of this record, and therefore it has been referred to human dispatchers 16 for handling. Therefore, if the current record is in the exception file, the dispatching process returns to step 54 to get a new dispatching record.

If the dispatching record is not in the exception file, dispatching process 26 continues to step 60 and determines the status of the dispatch record by checking the second field of the record as shown in FIG. 3A. If the record has the status "prescheduled", indicated by a " " in the second field of the record, this indicates that the transportation task described by the record has yet to be dispatched. In this case, the dispatching process 26 continues to step 62 to determine whether the record should be dispatched at the present time.

If the record is not prescheduled, then as illustrated in FIG. 3A, the record has either been dispatched or it has been cancelled or the job has been completely finished. In any of these cases, the record is no longer in need of dispatching, and therefore dispatching process 26 returns to step 54 to get a new dispatch record.

If a prescheduled record has been located which is not in the exception file, then the dispatching process 26 continues to step 62 at which it determines which company or customer the record relates to.

Each dispatching process 26 is associated with a particular company or client and performs only dispatching for this one company or client and ignores any dispatching records in dispatch file 30 which relate to other companies or clients. The dispatching process 26 determines the company or client for which it is responsible from an automated dispatch setup file 48 which, as noted above with respect to FIG. 3I, indicates a company code that the automated dispatch processes are to operate upon.

Thus, in step 62, dispatching process 26 determines whether the currently selected record is for the current company. If not, the dispatching process skips the current record and will not dispatch it, and returns to step 54.

If the dispatching process 26 locates a record which is not in the exception file, is prescheduled, and is for the current company, then it determines if the job represented by the dispatch record should be initiated. If the dispatch record is marked "ASAP" in the fourth field, then the job should be dispatched immediately and the dispatching process 26 proceeds directly to step 66. Otherwise, the dispatching process determines if the time has arrived to schedule the job. This is determined by comparing the current time to (a) the appointment time indicated in the fourth field of the dispatch record, (b) the lead time indicated in the fifth field of the dispatch record, and (c) the advance action time indicated in the second field of the setup file record for the current company as seen in FIG. 3I. If the appointment time, minus the lead time, minus the advance action time, is earlier than the current time, this indicates that the job should be initiated and a vehicle should be dispatched to meet the appointment, and the dispatching process 26 proceeds to step 66. If not, the dispatching process skips the record by returning to step 54.

If the current dispatch record is to be dispatched by the dispatching process 26 as determined in step 64, the dispatching process proceeds to step 66 and requests from the AVL system 18 a list of the N closest vehicles which are capable of handling the job. This is done by adding a automated dispatch request to the automated dispatch requests file 44, using the format shown generally in FIG. 3H and specifically in FIG. 3K-1.

To generate the request shown in FIG. 3K-1, dispatch process 26 uses the transport ID number and the terminal number displaying the results of the dispatch process 26, or the processor number running the dispatch process 26, to generate a record ID as shown in FIG. 3K-1. The record ID is made unique by appending a three digit sequence number to the transport number and terminal number. In addition, dispatching process 26 extracts the transport type identified in the sixth field of the current dispatch record (see FIG. 3A) and places this transport type into the automated dispatch request in the third field, as shown in FIG. 3K-1. In addition, the dispatching process 26 retrieves the pickup address location from the tenth field of the dispatch record (FIG. 3A) and inserts this address information into the fourth, fifth, sixth and seventh fields of the automated dispatch request message shown in FIG. 3K-1. Finally, the dispatching process 26 identifies the number N of vehicles to be identified by the AVL system 18 in response to the request and inserts this number in the eighth field of the automated dispatch request as shown in FIG. 3K-1. For error correction purposes, a cyclic redundancy code (CRC) is added to the end of the automated dispatching request as shown at the end of FIG. 3K-1.

After placing the appropriately formatted request in the automated dispatch requests file 44, dispatching process 26 waits for a response to appear in the automated dispatch responses file 46. (The mechanism for delivering the request to the AVL system 18, obtaining a response from AVL system 18, and placing this response in the automatic dispatch responses file 46, will be discussed below with reference to FIGS. 6A and 6B. For the purposes of FIG. 4A, this operation is completed in background and a response can be found in automated dispatch responses file 46 after a sufficient period of time.) When a response is found in automated dispatch responses file 46 (step 68), dispatching process 26 proceeds to step 70 to evaluate the response received. (The response is deleted from the responses file once it has been read in step 68.)

In step 70, dispatching process 26 scans the particular vehicles identified by the AVL response to locate a vehicle which is currently available. This is done by using the vehicle identification numbers returned from the AVL system to look for a record in the outbound vehicle file 36. If a record for the vehicle is found in the outbound vehicle file, then the vehicle is not available and the dispatching process must check another vehicle.

If, after evaluating all of the vehicles identified by the AVL, no available vehicles are located, the dispatching process is unable to automatically dispatch the current job and must request human intervention. In this case, the dispatching process proceeds to step 80 at which it writes an exception record to the exception file (FIG. 3J), indicating the transport ID number of the current dispatch record and a reason code indicating that the automated dispatching failed because of the absence of an available vehicle. Subsequently, a human dispatcher 16 will evaluate the dispatch record and take the appropriate action, for example, calling individual vehicles to ensure that they have in fact not completed their current assignments, or, calling the customer who requested the job to inform them that a vehicle will be dispatched late for the pickup. After writing a record to an exception file in step 80, dispatching process 26 moves on to the next record in the dispatch file by proceeding to step 54.

If an available vehicle is located in step 70, dispatching process 26 proceeds to step 72 at which it updates the current dispatch record by inserting the identification of the current vehicle and the identification of the crew (i.e., driver and attendant). This information is inserted into the seventh through ninth fields of the dispatch record. Second, the dispatch record is marked as dispatched by storing a "D" into the second field of the record. Third, the dispatching process stores the current time in the seventeenth field of the dispatching record to indicate when the crew was notified of the assignment. Finally, dispatching process 26 updates the outbound vehicle file record for the selected vehicle to associate the vehicle with the transport ID number of the current dispatch record, for later reference.

Next, the dispatching process 26 proceeds to step 74, at which it prepares to notify the crew of the new assignment. To do so, the dispatching process 26 pages the driver, by using the driver's mobile pager to inform the driver that a new job has been assigned to him. Initially, the dispatching process 26 creates data to be transmitted to the pager, which may include a simple code to indicate that a new job has been assigned to the driver, or may include more involved data including the pickup location and/or the appointment time. The amount of data to be transmitted to the pager is determined from the kind of paging system in use. When a simple telephone-number-only pager system is used, a simple code is transmitted, whereas when a full text pager is used, more information may be transmitted. A voice-mail pager might also be used, in which case a voiced message would be delivered by the pager.

To transmit the page, the dispatching process 26 initiates a loop in which it repeatedly attempts to transmit the page to the paging service. This loop is repeated a given number, for example, three times to permit ample opportunity for the page to be accurately transmitted to the paging service. The number of retries for paging, and for other activities discussed below, may be hard-coded into the software or may be stored as a parameter in setup file 48. For the purposes of the following discussion, it will be assumed that the number of retries is three, regardless of how this value is determined by the software.

A page counter is initialized in step 74 to count the number of repetitions in this loop. In step 76, (now referring to FIG. 4B) this pager counter is incremented. In step 78, dispatching process 26 determines if the counter has exceeded the maximum number permitted. If the counter has exceeded the maximum number the dispatching process proceeds to step 80 (FIG. 4A) to write a record to the exception file indicating the transport ID number of the current dispatch record, and a reason code indicating that the unrecoverable error was due to a failure to communicate a page to the paging service.

However, if the dispatching process has not already paged the driver three times, it proceeds to page the driver by referencing the employee pager file shown in FIG. 3E to determine the pager service and personal identification number and telephone number used to page the employee who is identified as the driver in field 8 of the dispatch record. The pager service associated with the employee in FIG. 3E is then used to select a record from the pager service file 42 corresponding to the pager service to which the employee subscribes. The dispatching process 26 then reads from the pager service file the pager service modem number, the login ID, password, baud rate, word length, stop bits and modem script that can be used to access the employee's pager service. This information is then used to control a modem to dial the employee's pager service and transmit a message to the pager service indicating that the employee should be paged and notified of the new job assigned to the employee.

If the paging operation is successful, this is determined in step 82 and processing proceeds to step 84 to begin generation and delivery of a route. However, if the paging operation fails for one reason or another, for example, because a modem has failed, or because the line at the pager service was busy when dialed, then dispatching procedure 26 returns to step 76 to increment the pager counter and make another attempt to page the employee. After three attempts have been made, as noted above, dispatching procedure 26 proceeds from step 78 directly to step 80 and writes the record into the exception file with an indication that paging was not completed.

It should be noted that the most typical cause of a failure to communicate a page to the paging service is a faulty modem. There may, however, be other problems not associated with the modem. For this reason, in an alternative embodiment of the dispatching process, the process might proceed to the subsequent steps described below (including preparing a mobile terminal message to the vehicle) despite a failure to initiate a page of the vehicle. This redundant communication to the vehicle reduces the opportunity for a vehicle to miss receipt of a command.

It should also be noted that there are some paging services that will confirm receipt of a page at the pager; this kind of service can be important in vehicle dispatching since it prevents the driver from neglecting his/her duties and then claiming that the page was not received. If the paging service provides receipts, these might be detected and logged, for example by an additional background process having the sole purpose of collecting and logging receipts. Separating this function into a separate background process would avoid delays of the main processes while waiting for receipts. Such a background process could also perform step 104 discussed below, which awaits confirmation of an MDT message, and thereby further eliminate delay of the main process.

If paging is completed successfully, dispatching procedure 26 proceeds to step 84 at which it initializes a route counter. This counter is used in connection with a loop including steps 86-92, in which the dispatching procedure attempts to generate a route for delivery to the selected vehicle's driver.

In this loop, at step 86, dispatching procedure 26 increments the route counter and at step 88, dispatching procedure 26 determines whether the route counter is greater than three (for example). If the route counter is greater than three, then the dispatching procedure 26 has made three failed attempts to obtain a route from the AVL system 18 and therefore determines that an unrecoverable error has occurred during automated dispatching. In this case, the dispatching procedure proceeds to step 80 (FIG. 4A) and writes the current transport ID number to an exception record along with a reason code indicating that automatic dispatching failed due to failure to obtain a route from the AVL.

If however, the dispatching procedure has not yet tried three times to obtain a route, the dispatching procedure proceeds to step 90 and initiates a request to be sent to the AVL system 18 to obtain a route for the driver to his assigned destination. To do this, the dispatching procedure 26 generates an automated dispatch request record having the general format illustrated in FIG. 3G, and stores this record into the automated dispatch request file 44. The specific format of the automated dispatch request is shown specifically in FIG. 3L-1. As seen in FIG. 3L-1, the route request includes the vehicle identification number for the vehicle selected to service the dispatch request, as well as the pickup address, city, state and zip code, and destination address, city, state and zip code. The pickup and destination addresses are obtained from the tenth and thirteenth fields in the dispatch record. In addition, the dispatching procedure 26 includes a cyclic redundancy code at the end of the request as shown in FIG. 3L-1.

The AVL system 18 includes algorithms to derive routing for drivers from identified pickup points to identified destination points. These algorithms will respond to the information in the request shown in FIG. 3L-1, and generate a response of the kind illustrated in FIG. 3L-2. This response includes a record identifier which is identical to the record identifier in the request in FIG. 3L-1, followed by a route string, which is a text string indicating a list of street names, of streets to be followed along a best route from the pickup address to the destination address.

Under normal operation, the AVL system will produce a response of the kind shown in FIG. 3L-2 within a predetermined period of time. Accordingly, dispatching procedure 26 waits for this predetermined period of time and then proceeds to step 92 at which it determines if a route has been received from the AVL system by scanning the contents of the automated dispatch responses file 46 for a record having the same record ID as was incorporated into the request of FIG. 3L-1. If no response is received within this time period, then automated dispatching procedure 26 re-requests a route by returning to step 86. However, if a route has been received, automated dispatching procedure (after deleting the response from responses file 46) proceeds to step 94 in which it creates a mobile data terminal message for the selected vehicle, incorporating the routing directions returned from the AVL system, and also incorporating any additional information of use to the driver which might be incorporated into the dispatch file records when the dispatch file records are created by call takers 12 or remote data entry terminals 14.

One specific format for the mobile data terminal message is illustrated specifically in FIG. 3M-1. The mobile data terminal request incorporates much of the data in the dispatch record, including the transport identification number (field 4 of FIG. 3M-1) the date of service (field 5), the appointment time (field 6) and the transport type (field 7). Also included is patient information including the patient's name and phone number (fields 9 and 10); this information is obtained by referencing a patient information file (not shown) using the patient ID found in field 28 of the dispatch record.

Also included in the mobile data terminal records are the pickup city, street address, state and zip code and the destination street, city, state and zip code (fields 10-17). Next are four text fields for identifying the reason for the transport; this data is derived from fields 24-27 of the dispatch record and is entered by the call takers 12 or the remote data entry terminals 14 for relaying to the drivers. Finally, various vehicle status information is transferred from fields 16-23 of the dispatch records to fields 22-30 of the mobile data terminal record, including the time of the call requesting vehicle service, the time the crew was notified, the time the crew was dispatched, the time the crew was confirmed as en route, the time the crew arrived at the pickup site, the time the crew was confirmed as en route to their destination, the time that they arrived at their destination and the time that they became available. Finally, in field 30, the mobile data terminal message includes the route message for the route generated by the automated dispatching procedure in steps 90 and 92 as discussed above.

To transmit data to the mobile data terminal, dispatching procedure 26 follows a third loop which re-tries three times (for example) to transmit to the mobile data terminal via the AVL system. In the first step 96, dispatching procedure 26 initializes a mobile data terminal counter, and in a subsequent step 98, dispatching procedure 26 increments this counter. After step 98, dispatching procedure 26 determines 100 whether the mobile data terminal counter is greater than three, and, if so, proceeds to step 80 to write a record to the exception file with a reason code indicating that data transmission failed. In step 102, dispatching procedure 26 stores the mobile data terminal request record, as shown in FIG. 3M-1, into the automated dispatch requests file 44.

When the mobile data terminal information request has been placed into the automated dispatch requests file 44, a communications process 24 (discussed below with reference to FIGS. 6A and 6B) forwards this request to the AVL system 18. The AVL system in response transmits the mobile data terminal information to the vehicle. The vehicle driver then confirms receipt of the information to the AVL system and the AVL system acknowledges this response to a communications process 24 which then places a mobile data terminal response record into the automated dispatch responses file 46. The format of this confirmation is shown in FIG. 3M-2. It essentially includes the same record ID number as was used in the mobile data terminal request of FIG. 3M-1. When this confirmation is received in step 104, dispatching process 26 deletes the response record from the responses file 46 and proceeds to step 106 to perform other dispatching activities. However, if this confirmation is not received after a predetermined period of time, dispatching process 26 proceeds to step 80 (FIG. 4A) to write a record into the exception file 32 along with an indication that automated dispatching failed due to failure to reach the vehicle with a mobile data terminal message.

If a mobile data terminal message is successfully sent to the vehicle and a confirmation is received in step 104, then dispatching process 26 proceeds to step 106 in which it first stores the current time into the dispatch record as the time that the crew is dispatched (field 18).

Next, the dispatching procedure 26 generates a request to the AVL system to determine the latitude and longitude of the vehicle. This is done by generating a request having the format shown in FIG. 3N-1. This request essentially includes the transport number and vehicle ID number (fields 3 and 4) and the pickup and destination addresses (fields 5-12). The dispatching process 26 does not wait for a reply to this latitude-longitude request, because such a reply can take, in many cases, an inordinate amount of time to be returned. Rather, dispatching process 26 proceeds directly from step 106 to step 54, at which it gets a new dispatch record and begins processing the new dispatch record in the manner discussed above. When the latitude and longitude is ultimately returned, this data is incorporated into the dispatching record by a communications process 24 as is discussed in further detail below in connection with FIGS. 6A and 6B.

It will be noted that, as a result of the foregoing procedure, whenever a vehicle is dispatched, the vehicle is immediately thereafter delivered a suggested route for the requested transit. This not only assists the driver if the driver enters unfamiliar territory, but also is a way to ensure that the vehicles follow recommended best routing.

As is noted variously within this application, insurance and Governmental institutions have applied stringent requirements to ambulance carrier billing. One area that as yet is perhaps underregulated, however, is the mileage charged by the carrier. Governmental agencies could, and perhaps in the near future may, begin verifying the mileage charged by ambulance carriers by computing a route from the pickup to destination locations and comparing the mileage of the computed route to the mileage actually charged by the carrier. In the recent past, electronic invoicing for ambulance services has been used increasingly; this trend also facilitates automatic electronic verification of mileage charges.

As noted above, it is one aspect of the present invention to automatically deliver, during vehicle dispatch, the exact route which will be used by Government or insurance agencies in verifying the mileage charges accumulated by the vehicle. Furthermore, it is a related aspect of the invention to automatically perform such verification upon an ambulance service invoice to determine if the mileage charges on the invoice are within parameters set by a Government or insurance agency.

Figure 5:
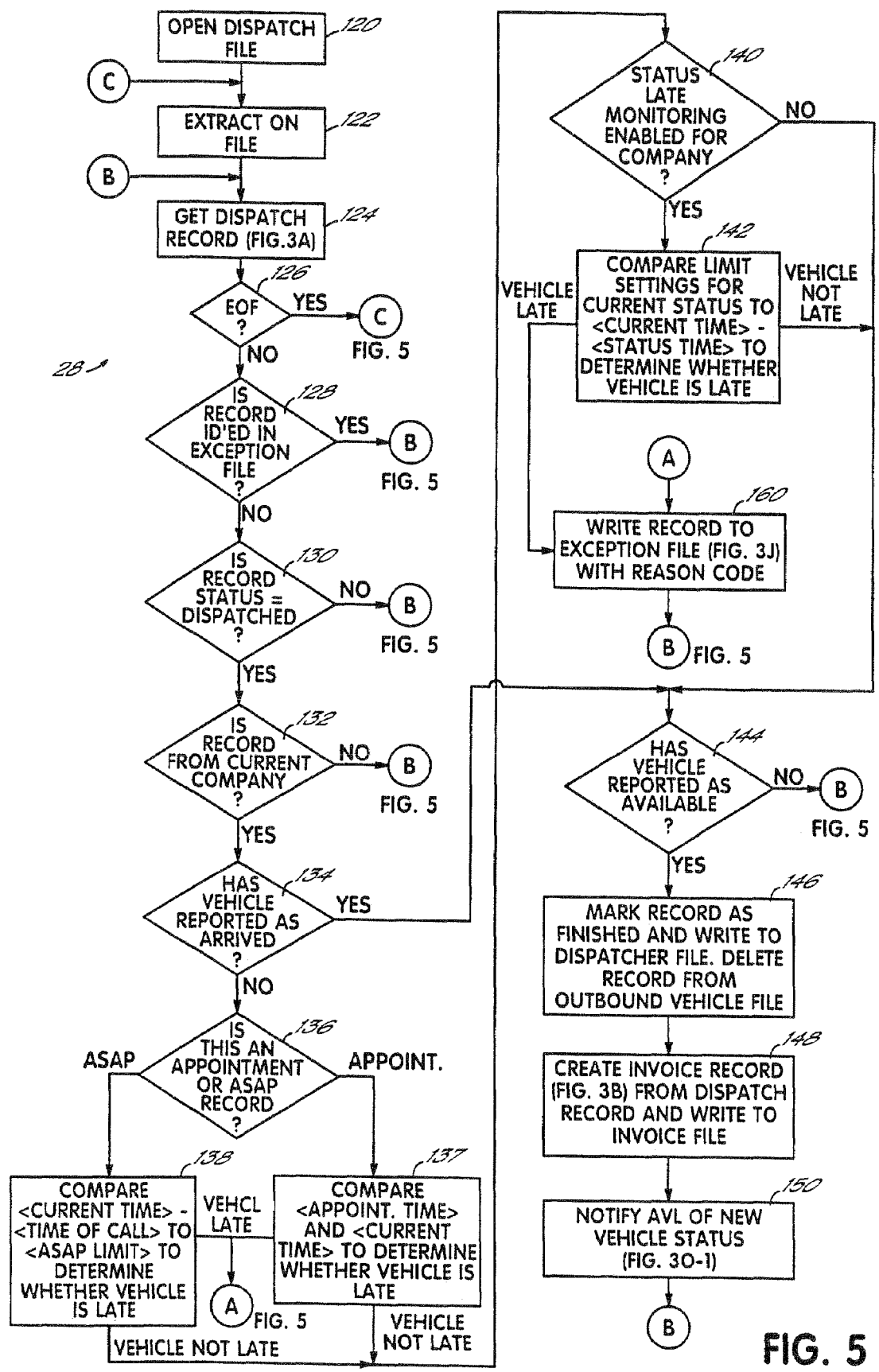
FIG. 5 is a flow chart of the operations performed by a Vehicle Monitoring process of FIG. 1.

Referring now to FIG. 5, the operations of the vehicle monitoring process 28 can be discussed in particular detail. The vehicle monitoring process is responsible for tracking and monitoring the activities of vehicles once they have been dispatched by one of the dispatching processes 26. It operates in generally the same overall fashion as the dispatching processes 26, by reviewing records in the dispatch file and acting on individual records when action appears to be needed. Accordingly, in the first step 120, the vehicle monitoring process opens the dispatch file 30 and then extracts 122 the dispatch records from the dispatch file. Then, it gets 124 a particular record from the dispatch file for review. If the end of the dispatch file is reached in step 126, the vehicle monitoring process returns to step 122 to re-extract the records from the file and re-analyze each record.

If a record has been found and the end of file has not been reached, the vehicle monitoring process 28 moves on to step 128 and determines whether the current record is identified by a record in the exception file 32. If the record is identified in the exception file, this indicates that the automated dispatching processes have found an irreconcilable error and have referred the dispatch job for human intervention. Accordingly, the vehicle monitoring process returns to step 124 to get a new dispatch record.

If a record is found which is not in the exception file, the vehicle monitoring process 28 proceeds to step 130 and determines the status of the current dispatch record. If the record is marked as dispatched, then the vehicle monitoring process 28 is responsible for monitoring the status and progress of the vehicle in servicing the record. However, if the record status is not dispatched, then the vehicle monitoring process 28 is not concerned with the record and so returns to step 124 to get another record.

If a record is found which is not in the exception file and is dispatched, the vehicle monitoring process then proceeds to step 132 to determine if the record is a record for the company or client being serviced by the vehicle monitoring process 28. This is determined by accessing the automated dispatch setup file 48 and, in particular, field 1 of that file as shown in FIG. 3I, which identifies the company code for the company currently being serviced by the automated dispatching system. This company code is then compared with the transport ID number in the first field of the dispatch record as shown in FIG. 3A, which, as noted above, contains the company code. If the record is not related to the company currently being serviced by the automated dispatching system, the vehicle monitoring process skips the record by returning to step 124 and getting a new record.

If, however, a record is found which is not in the exception file, is currently dispatched, and is a job for the current company, the vehicle monitoring process proceeds to step 134 at which it determines whether the vehicle assigned to the record has reported itself as arrived at its pickup site. This is determined by checking the value in the time crew arrived at pickup field, which is the 20th field in the dispatch record as illustrated in FIG. 3A.

One of the important functions of the vehicle monitoring process is to determine if a vehicle is late for arrival at its pickup site and, if so, to warn the human dispatchers 16 so that the appropriate action can be taken, for example, calling the customer to inform them that the vehicle will be late. Accordingly, if a vehicle has not reported as arrived, the vehicle monitoring process proceeds to steps 136 et seq. at which it determines if the vehicle is late.

Initially, the monitoring process 28 determines simply whether the vehicle is late for arrival at the pickup site. To do so, process 28 first determines 136 whether the record is scheduled for a specific appointment time, or ASAP service. If the record is scheduled for a specific appointment time, process 28 proceeds to step 137 to determine if the current time is later than the appointment time. If the current time is later than the appointment time, process 28 proceeds to step 160 to write a record to the exception file 32 including a reason code indicating that automated dispatching failed because the vehicle was late to the pickup site.

If, however, at step 136, monitoring process 28 determines that the record is an ASAP request, then it proceeds to step 138 to determine whether the vehicle is late. In step 138, monitoring process 28 references the status limit file 44 to locate a status limit record (FIG. 3K) for the current company, and then reads the last field of this record to determine the "ASAP Limit" for the company. Then, process 28 compares the "ASAP Limit" to the difference between the current time and the time the ASAP request was received (as indicated in field 16). If more time than is indicated by the ASAP Limit has elapsed since the call was received, then the vehicle is considered late and monitoring process 28 proceeds to step 160 to write a record in the exceptions file.

If, however, in either steps 137 or 138, the vehicle is not determined to be late, then monitoring process 28 proceeds to step 140. At step 140, monitoring process 28 determines whether the company it is servicing uses late status monitoring for its vehicles. This is determined by referencing the third field of the automated dispatch setup file which indicates whether status late activity is to be monitored or not. If status late activity is to be monitored, the vehicle monitoring process proceeds to step 142 at which it determines whether the vehicle is late in reporting its status.

To determine if a vehicle is late in reporting its status, the monitoring process reviews the status times identified in fields 17 through 23 of the dispatch record to locate the most recent status reported by the vehicle. The vehicle status will be one of "notified", "dispatched", "en route to pickup", "arrived at pickup", "en route to destination", "arrived at destination", or "available". Then, if the status is anything other than "available", monitoring process 28 determines how long the vehicle has been at its current status by comparing the current time to most recent time in fields 17 through 22 of the dispatch record. Finally, the monitoring process 28 references the status limit file 49 to locate the status limit record (FIG. 3K) for the company to be serviced. From this record, the monitoring process 28 determines the status limit for the current vehicle's status. Finally, the time the vehicle has been at its current status is compared to the predefined limit for that status. If the vehicle has exceeded the predefined limit, then the monitoring process 28 proceeds to step 160 to write an exception record identifying the dispatch record and including a code indicating that the vehicle was late in its status reports.

If the vehicle is not otherwise late, but has not arrived (i.e., if the vehicle passes from steps 134, 140, or 142), then further analysis of the vehicle status may still be needed, because the pickup may have been cancelled by the customer at the pickup site, or the crew may have completed the job and reported itself as available. Thus, in the cases not discussed above, monitoring process 28 proceeds from steps 134, 140 or 142 to step 144, at which it determines whether the vehicle has reported itself as available. If not, monitoring process proceeds to step 124 to obtain a new dispatch record for processing.

However, if the vehicle has reported itself as available, monitoring process 28 proceeds from step 144 to step 146, at which it marks the status flag in the dispatch record (field 2) with an "F" to indicate that the record has been finished. This action will disable any further dispatching on the dispatch record. At the same time, monitoring process 28 deletes the record in the outbound vehicle file 36 which associates the vehicle with the dispatch record. Doing so will allow the vehicle to be recognized as available in step 70 of the dispatching process 26, so that new tasks will be assigned to the vehicle.

After these steps, the vehicle monitoring process proceeds to step 148 and generates an invoice record having the format shown in FIG. 3B, using the information in the dispatch record, and then writes the resulting invoice record to the invoice file 34 for later use in generating invoices for the services rendered by the vehicle. As can be seen in FIG. 3B, the invoice record is generated by transferring various fields from the dispatch record into the new invoice record, including the transport ID number and date of service, the vehicle identification number and the driver and attendants' employee numbers, the pickup and destination, the reasons for transport and billing information, and the time of various activities including the time the dispatch request was received, the time the crew was notified, dispatched, reported as en route to pickup, reported as arrived, reported as en route to its destination, and reported as available upon completion of the job. This detailed information and other information discussed above is important in satisfying insurance companies and federal or state agencies who demand detailed billing for compensation for transportation services.

The information in the invoice record maybe used to print an invoice for mailing without further human intervention. Or, alternatively, the information might be used to generate and transmit an electronic invoice for services, leading to electronic payment, such that the entire transaction may be completed in a paperless manner without postage expense and handling, and the resulting delays and risks of loss. Another alternative is that the invoice records might be transmitted to customer sites (those having remote data entry persons 14 {FIG. 1}), to print an invoice at the customer site for delivery. Again, postage expense, delay, and risk of loss are reduced or eliminated through direct electronic billing.

After generating a suitable invoice record, the vehicle monitoring procedure proceeds to step 150 at which it notifies the automatic vehicle locator system 18 that the vehicle is now available. The automatic vehicle locator system 18 retains internal tables indicating the status of each of the vehicles that it tracks, so that it may for example display the status of vehicles and their locations for a human dispatcher 16, or may produce reports of vehicle activity and vehicle availability.

The AVL system is notified of a new vehicle status by an automated dispatch request having the general format shown in FIG. 3G which is stored into the automatic dispatch requests file 44 and forwarded to the AVL system by the communications process as discussed below with reference to FIGS. 6A and 6B. The specific format of the AVL transport status update is shown in FIG. 3O-1, and includes various information from the dispatching record, including the vehicle ID number, the transport ID number, the transport type, the appointment time, AVL system code for the new transport status, and the time at which this status became effective, the driver and attendant employee numbers, the patient's name and the pickup and destination addresses.

After thus notifying the AVL that a vehicle is available, the vehicle monitoring process 28 returns to step 124 to get a new dispatch record.

It will be noted that the monitoring process described above relies on the vehicle operators to update their status regularly as they proceed through an assigned task. While this is an effective system for updating status, others might be used. For example, to determine whether a vehicle is en route, the monitoring process might compare two recent position readings for the vehicle to determine whether the vehicle is moving. To determine whether a vehicle is at the pickup or destination site, the monitoring process might simply compare the position of the vehicle to the position of the pickup and destination site. If such an approach is taken it is important to use highly accurate navigation tools, to discriminate a vehicle which is at the pickup site from a vehicle which is caught at a traffic light one block away from the pickup site. However, it is believed that these obstacles can be overcome and monitoring performed with even less human involvement than is described above.

Figure 6A:
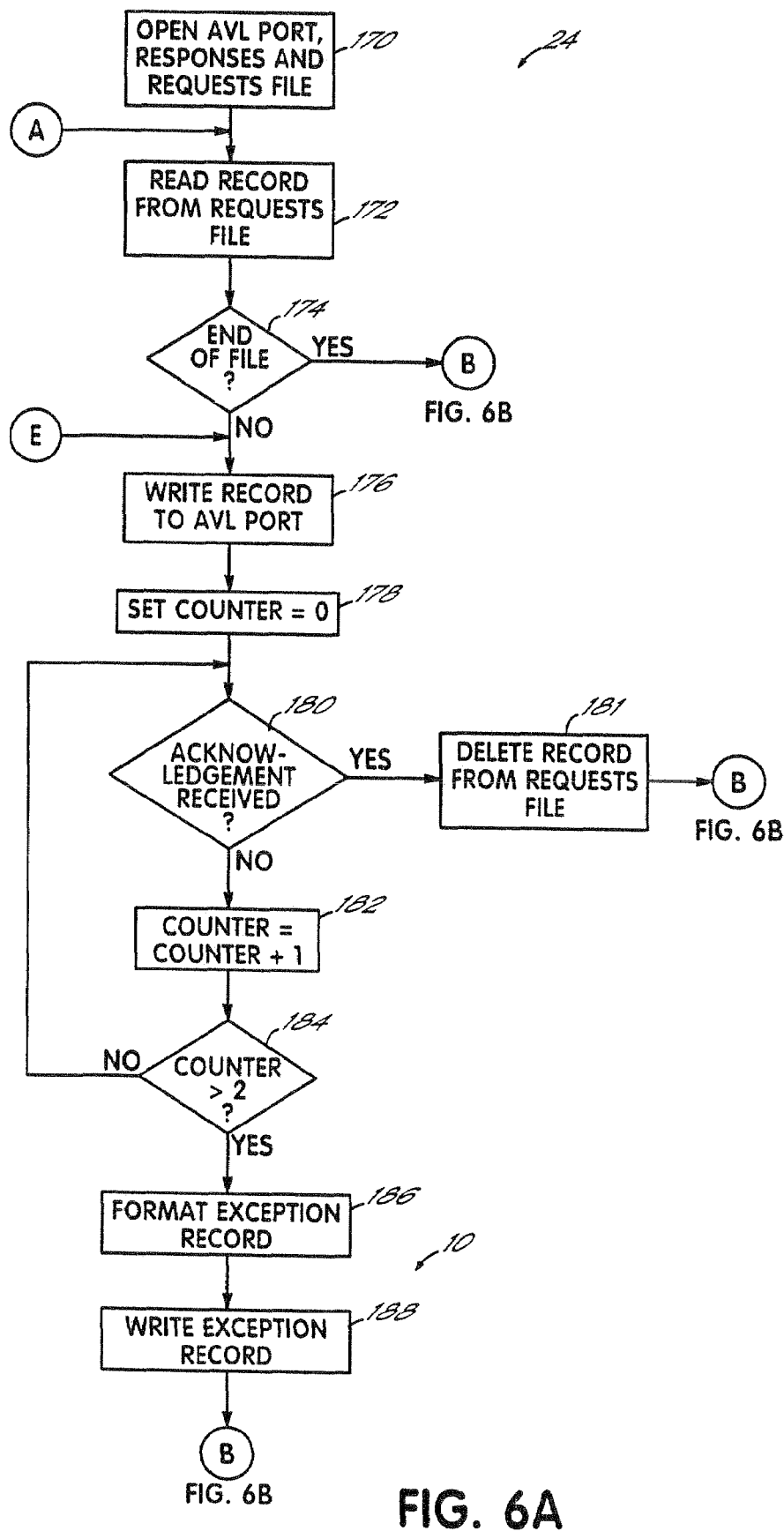
FIGS. 6A and 6B are flow charts of the operations performed by a Communications process of FIG. 1.
Figure 6B:
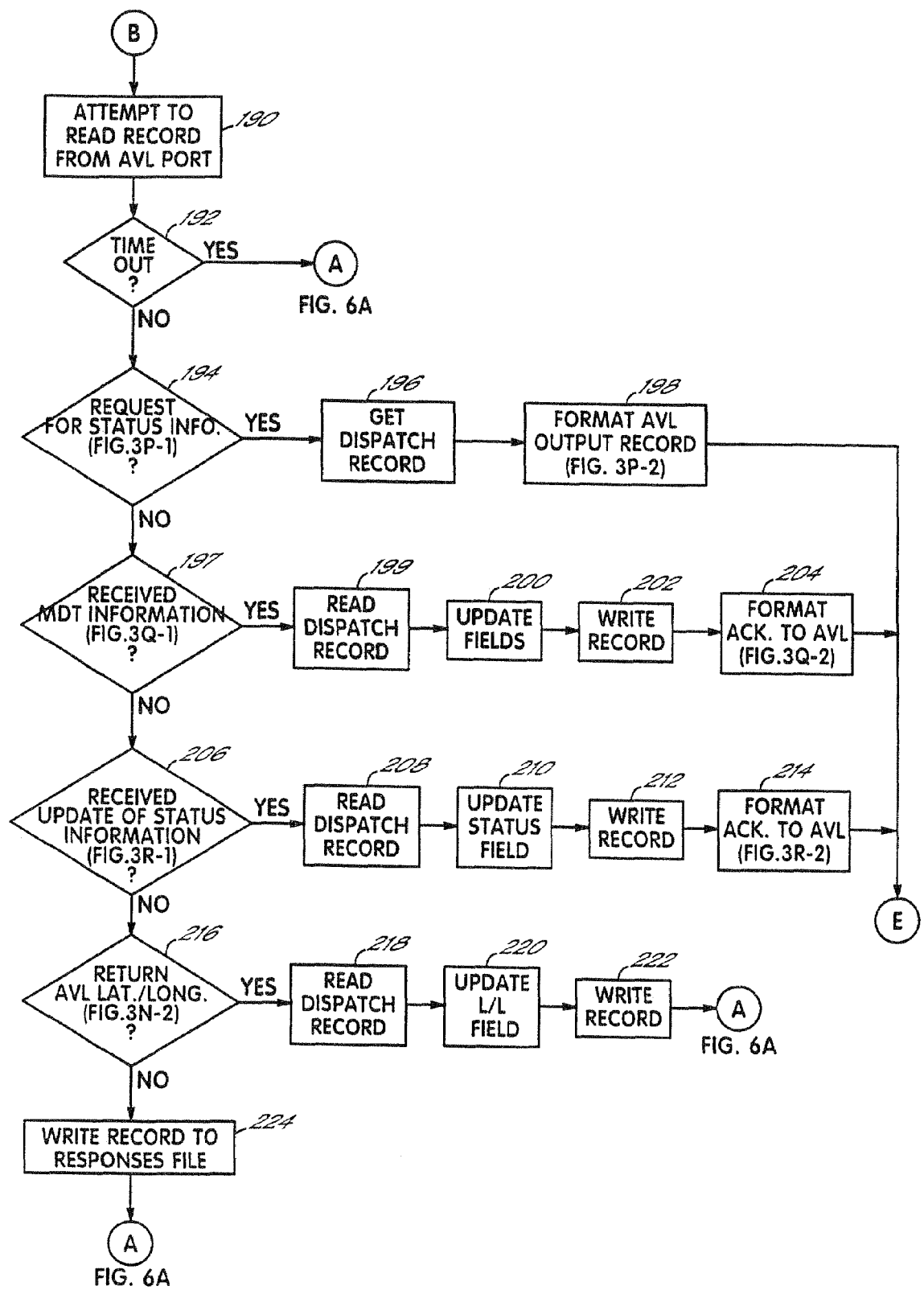

Referring now to FIGS. 6A and 6B, the communications process 24 can be more completely understood. The communications process reads requests from the automated dispatch request file 44, generates the appropriate communications to the AVL system 18, and also reads responses from the AVL system 18 and produces response records and stores them into automated dispatch responses file 46 so that the response records can then be evaluated by dispatching process 26 or vehicle monitoring process 28.

To initialize itself, the communications process 24 opens 170, a communications port to the AVL system 18 and also opens the requests file 44 and responses file 46.

The first part of the communications process illustrated in FIG. 6A is responsible for reading requests from the requests file 44 and generating communications to the AVL system 18 through the AVL port. Accordingly, in this portion of the communications process 24, the communications process reads a record from the request file (step 172). If at step 174 the end of the request file is reached, the communications process proceeds to step 190 (FIG. 6B) to evaluate responses. If, however, the end of the file has not been reached, the communications process proceeds to step 176 and writes the information from the current record to the AVL port. Then, the communications process performs a loop in which it waits for an acknowledgment from the AVL system 18. This loop is repeated three times (for example) as determined by a counter which is initialized to zero in step 178. If an acknowledgment is received in step 180, the communications process then deletes the request record from the requests file (step 181), and proceeds to step 190 (FIG. 6B) to handle responses from the AVL. However, if no response is received, the communications process increments the counter (step 182) and then determines whether the counter has been incremented above a value of two (step 184). If the counter has not yet reached a value of two in step 184, the communications process returns to step 180 to determine if an acknowledgment has yet been received.

However, if the counter exceeds the value of two (for example), then the AVL communication has failed. In this situation, the communications process proceeds to step 186 in which it generates an exception record based on the request and then writes the exception record to the exception file (step 188) to refer the situation to a human dispatcher 16. The exception record includes a code indicating that automated dispatch failed in attempting to communicate with the AVL.

After steps 174, 181 or 188, the communications process arrives at step 190 of FIG. 6B. At this step and in the subsequent steps, the communications process attempts to read information from the AVL system 18 and prepare the appropriate response records for use by the dispatching process 26 or vehicle monitoring process 28. If the AVL port times out 192 before a response is received, then the communications process simply returns to step 172 (FIG. 6A) to locate records in the requests file, if any, and act on those records.

If, however, information is received from the AVL port, the communications process 24 evaluates the information received from the AVL port to determine what kind of message is being received and to take the appropriate action. For example, if a request for status information is received, this is determined in step 194 and handled in steps 196 and 198. If mobile data terminal information is received, this is determined in step 197 and handled in steps 199-204. If an updated status is received from a vehicle, this is determined in step 206 and handled in steps 208-214. If a latitude and longitude for a vehicle is returned from the AVL, this is determined in step 216 and handled in steps 218-222. Other responses from the AVL are handled in step 224.

A request for status information may be generated unilaterally by the AVL to update its internal tables of vehicle status information. Such a request is received by the communications process in the form shown in FIG. 3P-1. The request includes a record identification number which is equal to the vehicle identification number for which the status is requested. To respond to this request, the communications process accesses the dispatch record for the job currently being handled by the vehicle identified by the vehicle ID number in the request for status information. This is done by referencing the outbound vehicle file 36 to determine the transport ID number associated with the vehicle ID number. Then, this transport ID number is used to retrieve the dispatch record from the dispatch file 30 having this transport ID number. Then, in step 198 this dispatch record is used to generate a response to the AVL identifying the status of the vehicle. This response takes the form illustrated in FIG. 3P-2 and includes the vehicle identification number, the transport record identifier, the type of the vehicle, its current appointment time, its status and the time that its status was last updated, the driver and attendant employee numbers, the patient's name and the pickup and destination addresses. This output record is then returned to the AVL system 18 by proceeding directly to step 176 in FIG. 6A and writing the contents of this record to the AVL port.

Mobile data terminal information may be transmitted unilaterally from the AVL system 18, in response to an entry of updated information into a mobile data terminal by a vehicle driver. When the vehicle driver transmits amendments to mobile data terminal information, these amendments are received by the AVL system 18 and then forwarded to the communications process 24. The format of the information received from the mobile data terminal is the same as the format of the information transmitted to a mobile data terminal as seen in FIG. 3M-1, with the exception that a route message is not returned from the mobile data terminal. The resulting record format is shown in FIG. 3Q-1.

To respond to mobile data terminal information received from the AVL, the communications process reads the transport identification number from the fourth field in the mobile data terminal information and uses this identifier to locate the dispatch record associated with the transport identification number in the dispatch file 30. Then the communications process reads this dispatch record (step 199) and updates the fields of the dispatch record in response to the mobile data terminal information received from the AVL system 18. For example, the ambulance crew may have updated the address of the pickup or destination, or may have added reasons for the transport or diagnostic information. After updating the dispatch fields 200, the communications process writes 202 the amended dispatch record into the dispatch file 30. Finally, the communications process acknowledges receipt of the transmission from the AVL system by generating a brief receipt message as illustrated in FIG. 3 Q-2. This message includes the record ID of the incoming mobile data terminal message and the vehicle identification number. The acknowledge message of FIG. 3Q-2 is then transmitted to the AVL system by proceeding directly to step 176 of FIG. 6A.

Updated status information may be received from vehicles unilaterally at many points during their performance of assigned duties. For example, when the vehicle wishes to confirm that it is en route to its pick-up, it may use its mobile data terminal to send a status update message to the automated dispatch system. Furthermore, when the vehicle becomes available, it may send a different status message. These status messages are received by the AVL system and then forwarded to the automated dispatch system and received by communications process 24.

Status messages may be prepared by typing information to the mobile data terminal. Or the mobile data terminal may be voice activated and controlled so that the driver and/or crew can control it hands-free while driving.

When a received updated status message is identified in step 206, the communications process first reads the updated status message to determine the associated dispatch record. The format of an updated status message is shown in FIG. 3R-1. The format includes a record identifier which includes the transport identification number and vehicle identification number. This record identifier is used to locate and read 208 the dispatch record based on the transport identification number. Next, the communications process 24 uses the status level identified in the third field of the status change message to update the status fields (fields 18-23 of FIG. 3A) in the dispatch record (step 210). Next, the dispatch record with updated status fields is written 212 back to the server 10 with the updated status information. Finally, an acknowledgement message of the form shown in FIG. 3R-2 is generated by the communications process and delivered to the AVL system by proceeding directly to step 176 of FIG. 6A.

Another type of message which may be regularly received by the automated dispatch system is the latitude and longitude of a vehicle, as is requested by the dispatching process 26 in step 106. In response to this request, the AVL system 18 will return a response having the format shown in FIG. 3N-2. The response includes a record identifier indicating the transport number, terminal number and sequence number supplied in the request shown in FIG. 3N-1. Furthermore, the response indicates the latitude and longitude of the pickup address and destination address supplied in the request message.

In handling a latitude/longitude response, the communications process first uses the transport identification number in the response to locate the dispatch record and to read 218 this dispatch record. Next, the communications process updates 220 the latitude and longitude fields (fields 11-12 and 14-15) in the dispatch record. Finally, the communications process writes 222 the amended dispatch record so that the latitude/longitude information is available for later use. Then, the communications process returns to step 172 to begin evaluation of records in the requests file 44.

Additional forms of responses may be handled by communications process 24. In particular, the response from the AVL which indicates the closest vehicles requested by a dispatching process (FIG. 3K-2) is handled by writing a corresponding record to the responses file 46 in step 224. Similar actions are taken to store a response of the kind shown in FIG. 3L-2 which indicates a route for a vehicle to a destination. Also, step 224 stores responses of the kind shown in FIG. 3M-2 which indicate a confirmation of a MDT message.

The communications process of FIGS. 6A and 6B may also be used to transmit and receive "manual" message packets, i.e., manually generated, non-standard messages which are exchanged between a human dispatcher 16 and the driver of a vehicle 20, particularly during exceptional situations. To perform such transmissions, a dispatcher 16 may use software to generate a suitable request message and store this request message in the automated dispatch request file 44. Furthermore, a driver may type (or voice-enter) a generic text message into a message data terminal and transmit it to the AVL system which will in response produce a generic text message that may be stored by communications process 24 in step 224 for review by a dispatcher 16. Thus, any software used by the dispatcher to monitor exception conditions and respond to those conditions, may use the automated data transfer capabilities of the communications process 24 to facilitate these communications.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art.

For example, one might include a field in each record of the automated dispatch file (see FIG. 3I), to indicate those customers for whom automated dispatching is to be performed. Doing so would add flexibility by, for example, permitting management to make a policy decision not to perform automated dispatching for a given customer or contract. To implement this, the dispatching process 26 illustrated below in FIG. 4A would need to be modified so that, in the initial series of tests 56-62, the dispatching process determines whether automated dispatching was enabled for the current company, and if not, immediately moves to step 80 to write the current record in the exceptions file for manual dispatching.

Furthermore, methods and apparatus described herein could be used for any kind of vehicles, not limited for example to taxis and ambulances. For example, shipping traffic, whether by land (e.g., semitrailers), sea (e.g., freighters) or air (e.g., cargo planes) could be dispatched and monitored under principles of the present invention. Moreover, land, sea or air traffic control could in general be performed in a fully automated manner using principles of the present invention. One particularly fruitful area is the ground traffic control of ground vehicles and airplanes at airport facilities; typically movements of ground vehicles and airplanes on the airport tarmac are controlled by human dispatchers using their visual information and/or radar systems, which system is prone to failures such as recently experienced at the Denver airport.

Data gathered from vehicles might not be limited to the vehicles' position and status; in addition, the system might gather information on whether the vehicle is moving, the velocity of the vehicle, whether the vehicle is braking, the fuel usage of the vehicle, whether emergency signals of the vehicle are operating, and whether the engine is idling. This data could be used to determine, for example, whether the vehicle is caught in traffic or moving smoothly to its destination. Furthermore, the system might detect situations where the vehicle is being used inappropriately, for example, a situation where the crew is between tasks and has left the engine idling for a long period of time. Two-way communication with the MDT might be enhanced, for example, to permit the central station to control actions of the vehicle, e.g., switch the vehicle's engine off. This function could be particularly useful as a theft prevention.

All of these embodiments, and others, are within the spirit and scope of the invention. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A system for controlling vehicles to provide transportation services without need for human intervention, comprising:
   a database including records each documenting needed transportation services;
   processing circuitry performing a dispatching process including instructing a vehicle to provide transportation service identified in one said record by computing a street route for the vehicle to follow; said processing circuitry further performing a monitoring process including reviewing vehicle activity information without human intervention to identify whether said vehicle is adequately providing the transportation services associated with the computed street route; and
   communication circuitry forwarding the computed street route produced by said dispatching process from said processing circuitry to a vehicle; said communication circuitry further providing vehicle activity information relating to said vehicle to said processing circuitry for review by said monitoring process.

2. The system of claim 1 wherein said processing circuitry is a microcomputer running a multitasking operating system, said multitasking operating system supporting both said dispatching process and said monitoring process.

3. The system of claim 1 wherein said processing circuitry is a network of computers, one computer of said network running said dispatching process and one computer of said network running said monitoring process.

4. The system of claim 1 wherein said processing circuitry performs multiple said dispatching processes in parallel and multiple said monitoring processes in parallel.

5. The system of claim 1 wherein said communications circuitry forwards instructions to a vehicle via radio communications.

6. The system of claim 1 wherein a vehicle reports information on its activities by radio communications to said communications circuitry.

7. The system of claim 1 wherein said communications circuitry forwards instructions to a vehicle and receives vehicle activity information from a vehicle via both ground-based radio communication and satellite-based radio communication.

8. The system of claim 1 further comprising satellite-based vehicle tracking circuitry for tracking locations of said vehicles, said communication circuitry being connected to said vehicle tracking circuitry for determining vehicle activities for forwarding to said monitoring circuitry.

9. The system of claim 8 wherein a request for transportation services requests a vehicle to travel to an appointed location, and said monitoring process reviews said vehicle activities to determine whether a vehicle has arrived at or is en route to said appointed location in deciding whether transportation services are being adequately provided.

10. The system of claim 9 wherein a vehicle operator manually communicates the arrival of said vehicle at said appointed location to said communication circuitry, and said monitoring process determines whether said communication has been received from the vehicle operator to determine whether transportation services are being adequately provided.

11. The system of claim 9 wherein said vehicle includes circuitry for automatically transmitting a position of said vehicle to said communication circuitry, and said monitoring process determines whether said transmitted position is similar to said appointed location to determine whether a customer request is being adequately serviced.

12. The system of claim 1 wherein said communication circuitry respectively reads and writes communication request and response records in said database, said processing circuitry instructing a vehicle to provide services by writing a communication request in said database for later forwarding by said communication circuitry, and said processing circuitry obtaining vehicle activity information by reading response records in said database.

13. The system of claim 1 further comprising data entry circuitry for manual operation to create a record.

14. The system of claim 13 wherein said data entry circuitry is located at a remote site in telephonic communication with said database.

15. The system of claim 14 wherein said data entry circuitry includes a reader for reading information from an identification card used by a person requesting transportation services.

16. The system of claim 13 wherein said data entry circuitry is a touch-tone responsive telephone receiver for receiving touch-tone telephone signals and creating a record therefrom.

17. The system of claim 1 wherein said database, said processing circuitry and said communication circuitry are located at a plurality of locations and in telephonic communication with each other.

18. The system of claim 1 wherein said vehicles are ambulances and said records including an indication of whether requested transportation services must include advanced life support facilities.

19. The system of claim 1 wherein said monitoring process creates exception records in said database identifying those records which are not being adequately serviced, and said system further comprises dispatcher circuitry for operation by a human dispatcher to use the exception records to locate records which are not being adequately serviced and take action with respect to such records.

20. The system of claim 1 wherein said vehicle activity information indicates one or more of:

whether said vehicle is moving, the velocity of said vehicle, whether said vehicle is braking, fuel usage of said vehicle, whether emergency signals of said vehicle are operating, and whether an engine of said vehicle is idling.

* * * * *